OPERATION SEEKING LOCALIZER WITH CROSS WIND

Patented Oct. 7, 1952

2,613,352

UNITED STATES PATENT OFFICE 2,613,352

RADIO NAVIGATION SYSTEM

Spencer Kellogg, 2nd, Glen Head, N. Y., assignor to The Sperry Corporation, a corporation of Delaware Application November 18, 1949, Serial No. 128,227

32 Claims. (Cl. 343—108)

My invention relates generally to a system and to the method of controlling a system, characterized by the fact that the system is primarily controlled in accordance with a time derivative term derived from the mathematical equation for the dynamics of the system. More particularly, my invention relates to a system, the mathematical expression for which may be written as follows:

(1) $k_1 s + k_2 \dot{s} =$ system control error, or, (2) $k_1 s + k_2 \dot{s} + k_3 \ddot{s} =$ system control error where $s$ and $\ddot{s}$ are time derivatives of $s$, and in which the system is controlled primarily in accordance with the computed value of one of the time derivative terms, the value of the term or terms necessary for such computation being supplied from actual measures of such quantities.

My invention more specifically relates to a system, the equation for which may be expressed as above indicated, and in which the first or the first and second terms in the equation are derived from suitable measuring apparatus while the system is controlled, in the former case, in accordance with the second term, and, in the latter case, in accordance with the third term, the values of the first or the first and second terms being supplied to a computing apparatus and the resultant value of the expression being supplied as a measure of the proper control to be exercised over the system. In other words, my invention contemplates solving for the instantaneous value of the control error in a system, at least within limits, and controlling the system in accordance with such error value, actual or limited, whereby after some time interval ($t$) all terms of the equation will reduce to zero indicating that the condition to be fulfilled has been satisfied.

My invention is herein illustrated and described in a preferred embodiment thereof which likewise serves as an exemplary illustration of the present invention in its broader aspects. For example, the manual piloting of an aircraft in accordance with some flight plan which may be either cross-country flying at some chosen heading or along some predetermined ground track such as that defined by a radio beam and the like, involves a system which may be mathematically expressed by the two dynamic equations above set forth depending upon which flight plan is being utilized. Therefore, it may be said in connection with a specific application of the present invention that my invention relates generally to aircraft control and navigation instrumentation and more particularly to a control and navigational aid for manually piloted aircraft wherein the pilot is relieved of the need of interpreting a number of independent flight instruments and of anticipating the amount of control demanded by such interpretation, both of which require a great amount of experience and skill.

This application is a continuation-in-part of my original U. S. application Serial No. 15,064, filed March 16, 1948 for Flight Indication System for Dirigible Craft, to be issued concurrently herewith.

Aircraft instrumentation in common use at the present time falls generally into two main categories—those instruments which indicate the position of the aircraft with reference to a desired flight path and those which indicate craft flight attitude. For example, an instrument which falls under the first category may be a standard ILS or Instrument Landing System indicator or meter which indicates to the pilot deviations of the aircraft from a fixed or predetermined radio course, but supplies no information as to the attitude of the craft or how much change of attitude is required to return it to the radio course or ground track. Instruments which may fall under the second category would be, for example, attitude and directional gyroscopes such as a gyroscopic horizon and gyroscopic compass. These instruments indicate deviations of the craft from normal flight attitude or heading respectively, but do not indicate whether the aircraft is on a given flight path.

By my invention I provide a flight instrument which may combine and correlate attitude, heading, altitude, and radio information and present this information on a single indicator. Such an indicator is preferably comprised of a minimum number of indicating elements such as, for example, a cross-pointer meter having one vertical and one horizontal bar. These bars when centered or crossed on a reference index advise the pilot that his craft is flying correctly in accordance with a selected flight plan although perhaps not on a given flight path. Such a plan may call for the use of the indication system of my invention as a flight instrument for "dead reckoning" flights, or as a radio navigation instrument, utilizing radio range system signals, or for making approaches to an airport under adverse weather conditions. With my invention, once a specific "plan of flight" has been chosen, the pilot causes the aircraft to approach and thereafter follow the "plan of flight" making the indicated attitude changes as dictated by instantaneous deflections of the vertical and horizontal bars of the cross-pointer indicator. With instrumentation of the type in common use at the present time, as above described, it is necessary for the pilot continuously and mentally to apply the instrument indications to his "plan of flight" and, as a result of this comparison, decide upon the proper, or the amount of control movement necessary to satisfy a desired condition. Thus, under all circumstances, my improved system relegates the attitude indicators and radio range indicators to standby usage. Therefore, to achieve the objective of any selected flight plan with my invention, it is only necessary for the pilot to observe a single indicator and to control only the aircraft attitude in pitch and roll to keep the bars of the meter in a normally centered position. As above stated, interpretation and correlation of the indications of other flight instruments is not necessary.

It will be seen that the dynamic mathematical equation for the system involving an aircraft controlled in the above manner may be expressed as follows—

$$k_1 s + k_2 \dot{s} + k_3 \ddot{s} = \text{Meter reading}$$

since, in the specific embodiment of my invention herein illustrated, the solution of the expression is attained in terms of meter reading. This equation may be rewritten as $$k_1 s + k_2 \frac{ds}{dt} + k_3 \frac{d^2 s}{dt^2} = \text{Meter reading}$$

In the present system and assuming that flight of the aircraft is to be controlled so as to seek and thereafter follow a radio beam, the term "$s$" will equal the displacement of the craft from its radio course as determined from a radio receiver. The second term $$\left(\frac{ds}{dt}\right)$$

is equal to the rate of change of the displacement error. This value is generally proportional to the angle between the direction of flight of the aircraft and the radio beam or course. Hence, by using a compass having a signal generator or pick-off associated therewith and by placing the course selector of the compass to the bearing of the radio beam any departure of the craft from such a heading can be employed to produce a signal proportional to the angle of departure. This angle will be proportional to the angle which the direction of flight of the craft bears to the radio beam or course and therefore this signal may be considered as proportional to the second term of the above equation, that is, the rate of change of "$s$". A further analogy may be drawn between the third term of the equation $$\left(\frac{d^2 s}{dt^2}\right)$$

which involves the second derivative of "$s$" and the bank angle of the craft, within limits. The bank angle of an aircraft is generally proportional to the rate of turn of the craft and therefore generally proportional to the rate of change of heading of the craft. It, therefore, follows that the bank angle of the craft may be considered as the second derivative of "$s$" with respect to time, at least within limits, that is when "$s$" and preferably the second term, or rate of change of "$s$," do not become too large.

In accordance with the present preferred embodiment of this invention, I propose to obtain measures of "$s$" from a radio receiver and the second term, involving rate of change of "$s$," from a compass. These terms are combined algebraically in accordance with the above mathematical equation and the resultant is supplied to a meter. The bank angle of the craft is controlled manually, and a signal proportional to the amount of bank of the craft is algebraically combined with the first and second terms of the equation and the algebraical sum of all terms of the equation is supplied to a zero reading meter. In this way, I control the system in accordance with the third term which may be considered as the acceleration term of the equation and so bank the craft as to make it equal to the algebraic sum of the other two terms. Actually, when approaching the radio beam, the acceleration term is made equal to the displacement term less the rate or first derivative term. Under these conditions, that is, when the dynamic equation for the system is satisfied, the meter reading will be zero and it is known that so long as the meter reading is maintained zero, either by increasing or decreasing the third term of the equation, then the craft will have been properly corrected or banked ultimately to reduce the entire equation and all the terms therein to zero, at some future time. The effect of time in these equations is not considered as a material factor in this simplified explanation thereof.

When the aircraft is off its chosen course there will exist some value for "$s$" and some value for the second term $$\left(\frac{ds}{dt}\right)$$

of the equation, if the heading of the craft does not parallel the given course. Therefore, the acceleration term will be made to equal the algebraic sum of the first two terms and the meter will read zero indicating that the amount put in as a control term in the system, which corresponds to the acceleration term of the equation, is exactly the correct amount to satisfy the equation. Ultimately, when the craft reaches the desired radio course and is flying along it at the correct heading, the term "$s$" will be zero because there is no radio error, the second term $$\left(\frac{ds}{dt}\right)$$

will be zero because the craft is neither approaching nor departing from the radio course and the third term $$\left(\frac{d^2 s}{dt^2}\right)$$

will likewise be zero since under these conditions the craft will be flying straight and level.

With the foregoing arrangement, it should be observed that by satisfying the dynamic equations of the system for the instantaneous values of $s$ and ($\dot{s}$), the aircraft, as a zero meter reading is maintained, will approach the radio course in an asymptotic manner, or, with large but empirically limited error values, may approach with but one overshoot. However, the pilot is never called upon to anticipate, and extended hunting will never result.

In the foregoing I have referred to my system in connection with navigating a craft to approach a desired radio beam. Not Equation 2 above. However, the present invention may also be employed in a similar manner to control a craft to seek and maintain a given compass heading. In this latter case, the first term of Equation 1 set forth in the foregoing will be measured in terms of compass error, corresponding to the second term of the above equation, Equation 2, while the bank angle will be proportional to the first time derivative of the compass error in Equation 1 which, of course, corresponds to the third term of Equation 2. Essentially, therefore, in accordance with my invention, the system will be controlled in accordance with a time derivative term whether it be the first time derivative or the second time derivative and, as a matter of fact, the control terms may even correspond to higher order time derivatives if required. In the system herein shown and described, there is no need, as a practical matter, to consider any term of higher order than that corresponding to the second time derivative of the displacement or radio error signal.

A brief description of the principal elements of a preferred form of my invention is as follows.

The specific embodiment herein illustrated of the craft navigation and flight control aid of my invention comprises an indicator which is preferably of the cross-pointer type, the vertical and horizontal indicating arms of which are moved from a normal or centered position by signals received from various craft attitude and position references. These references comprise a radio receiver adapted to produce a signal proportional to craft deviation from a predetermined radio ground track, a directional reference which is preferably in the form of a slaved gyro magnetic compass and which serves as a directional reference for the craft, a vertical gyro which supplies signals proportional to craft attitude in pitch and roll, an altimeter which supplies signals proportional to craft deviation from a selected altitude, a heading selector including a suitable pick-off which, when used in conjunction with the gyro magnetic compass, provides a signal proportional to deviations of the craft from said heading, and a selector switch which, under the control of the pilot, is adapted to supply the proper signals and in their correct polarity sense, such that the values substituted in the equation of the system will be of correct sign and the correct value of the control term will be computed.

The radio receiver, above referred to, provides a D.-C. signal which is proportional to craft deviation from any selected radio beam, such as a visual-oral radio range, or an omni directional range, a localizer radio beam, or a glide path radio beam, the latter two being primarily employed when the instrument of my invention is used as a blind landing aid. The heading selector serves as a means for setting a particular desired heading into the indication system. As such, it is a signal source which, under the influence of the magnetic compass, produces a voltage that is proportional to the magnitude of aircraft displacement with respect to a particular selected heading, and the polarity or phase sense of the signal represents the direction of such displacement.

A vertical gyro, by means of a pair of signal generators, one on the pitch axis and the other on the roll axis of the gyroscope produces signal voltages which are proportional to departure of the aircraft in attitude from straight and level flight. The resultant of the signal from the signal generator on the roll axis of the gyroscope and those derived from the radio receiver and the compass controls the position of the vertical bar of the indicator, and the resultant of the signal from the signal generator on the pitch axis and those derived either from the radio or an altimeter controls the positions of the horizontal bar of the indicator as hereinafter more fully explained.

The altitude control, comprising an altimeter and associated signal generator, supplies a signal voltage which is proportional to the departure of the aircraft from a predetermined selected altitude.

Amplifiers are provided for algebraically combining the respective error signals caused by airplane departure from a required flight path, that is, errors in altitude and errors in heading or ground track, with signals produced within the system by corrective airplane attitude changes, to thereby control the position of the vertical and horizontal bars of the indicator and thereby indicate to the pilot when the dynamic equation for the system is satisfied. The amplifiers may also function as signal limiters.

A selector switch provides the pilot with a means of supplying the system with the correct data for pursuing a chosen flight plan. A properly indexed knob, indicates the particular flight plan, and circuits are established by the switch to supply the correct signals in their proper relative polarity sense as terms in the equation for that flight plan so that the system may compute the equation and indicate whether it is satisfied or not. A change of plan can be introduced at any time by manipulation of the switch. Preferably, an interlock is provided within the switch for disconnecting the altitude control signal so that it will not influence the horizontal bar of the indicator when using the system as a blind landing instrument. Such interlock prevents conflicting signals from being supplied to the indicator.

The selector switch is provided with indices which indicate the following flight facilities; Flight Instrument, Approach, Omni Directional Range (O. D. R.)-Localizer Beam (LOC.) blue right or blue left, and Altitude "off" and "on." By setting the selector switch to the "Flight Instrument" position, the indicating instrument of my invention serves as an instrument for "dead reckoning" flight independent of radio. There are two radio track positions indicated on the switch, one for "blue right" and one for "blue left" as above indicated. These two positions are indicated on the switch by blue and yellow colors which appear in cutouts in the switch face to be hereinafter explained. These colors correspond with the colors on airways maps or sectional charts designating Visual-Oral Radio Ranges; the right hand side of the beam is, for example, shown in blue and the left hand side in yellow. Therefore, if the craft is flying towards a radio range station with blue on the right, the pilot sets the switch for "blue right." If he reverses his direction of flight, the blue side of the beam will be on his left, therefore he sets the switch to "blue left."

The reference for the heading displacement signal is controlled by the heading selector through rotation of a course setting knob thereon. This knob rotates a direction-sensitive synchro stator with respect to its signal-producing rotor. Under a "Flight Instrument" or dead reckoning plan of flight, this signal is algebraically combined with a signal produced by the roll synchro of the vertical gyro and the resultant or difference, is applied to the vertical bar of the indicator. The roll synchro signal is generated by changes in bank attitude and the proper bank serves to zero the indication. Without altitude control, the pitch synchro on the vertical gyro will indicate departure from level flight by applying a displacing signal to the horizontal bar of the indicator. Correction for this displacement lies simply in changing the pitch attitude of the airplane to recenter the bar. Under altitude control, a pickoff on the altimeter supplies a signal tending to displace the horizontal bar to thereby indicate departure from a chosen altitude. This signal is algebraically combined with that produced by the pitch synchro and with a correct pitch attitude, the horizontal bar will remain or become centered. In all other positions of the selector switch, the indicating system of our invention serves as a radio navigation instrument. In the Omni-Directional Range (O. D. R.)-Localizer Beam (LOC.) blue-right position, signals from a Visual-Aural Range (VAR), an Omni-Directional Range, or a localizer, are combined with those previously applied, as described for the "Flight Inst." position of the switch, to control the vertical bar of the indicator. This position requires that the blue sectors of the range station and localizer be to the right of the flight path as above pointed out. If the blue sector is to the left, the polarity of the incoming signals must be reversed by setting the selector switch to the "blue-left" position. Indexing of the selector switch to the "Approach" position automatically removes, through an interlock, the altitude control signal from controlling the horizontal bar of the indicator, and replaces it with a glide slope signal. This signal affects the horizontal bar in a manner similar to that derived from the altimeter.

The signals employed or the resultant supplied to control the indicator are preferably so limited that, when flying by the indicator, the attitude of the airplane can not exceed certain values. It has been empirically determined from many experimental flights that the preferred limitation is such that a bank angle of 30 degrees need not be exceeded to center the vertical bar for any magnitude of displacement; also that a six-degree pitch angle from level flight need not be exceeded to recenter the horizontal bar. These values may be altered, if desired, to provide any suitable range for particular flight conditions and/or types of aircraft.

Drift, due to cross wind, can readily be detected and compensated in the system of the present invention. If, on reaching and flying along a selected beam, there is persistent heading displacement while the vertical bar on the indicator is maintained centered, cross wind is affecting the flight path. A comparison of the actual heading of the airplane with the known direction of the selected beam on the combined indicator will furnish the drift angle. Manual alignment of the course dial and heading pointer and the course index of the indicator will correct for drift.

From the foregoing general description of the major essential elements of the preferred system of my invention, it can be readily seen that it is a versatile instrument, adaptable to many plans of flight. Furthermore, the execution of any flight plan is accomplished by simply controlling the attitude of the airplane to zero and maintaining zeroed the bars on the indicator. Such ease of operation enables the pilot to monitor other instruments efficiently. The need for scanning the instrument panel is markedly decreased, because the present system combines all the needed data and correctly computes the information sought by the pilot thereby removing all need for interpretation and correlation of the indications provided by numerous instruments, which otherwise must be mentally made. During any normal flight, transition from one instrument to another is not required from takeoff to landing. In conjunction with the gyropilot, it serves as a standby instrument to be used, if ever the need arises, with full confidence that the aircraft can be brought to a landing manually with complete safety even under extremely poor weather conditions.

It is therefore a primary object of the present invention to provide a system which is controlled primarily in accordance with a time derivative term in the dynamic equation for said system; and also to a novel method of controlling a system in this manner.

More particularly, it is an object of the present invention to provide a system and a method of controlling said system so as to cause a condition to approach and maintain a desired condition, wherein a measure of the error existing between the present and the desired condition values is obtained and the value of a time derivative term in the mathematical equation for the dynamics of the condition is solved for, using the measure of error as one of the terms in said equation, the system being controlled in accordance with the value of the time derivative term so solved for.

More specifically, it is an object of the present invention to provide a system for and a method of navigating a craft toward and maintaining it on a chosen course which functions to, or includes the steps of, measuring the error between the craft course and the chosen course, solving for a time derivative term in the mathematical equation for the dynamics of the craft using the measure of error as one term in said equation and controlling bank attitude of the craft in accordance with the value of the time derivative term so solved for.

It is an object of the present invention to provide an aircraft control and navigation system for enabling the pilot of the craft to follow a preselected flight plan merely by controlling the attitude of the craft in pitch and roll in accordance with the indication presented to him on an indicator, the craft being thus guided accurately to approach and maintain the selected flight plan.

It is a further object of the present invention to provide an aircraft control and navigation system of the foregoing character which comprises, as essential elements thereof, radio receiver means for measuring displacement of the craft from a radio beam, a compass such as a slave directional gyroscope, a vertical reference such as a gyro vertical, and an indicator, the signals from the various instruments being preferably supplied and algebraically combined in an amplifier and the resultant being supplied to actuate the indicator, the system functioning continuously to solve the dynamic equation of the craft such that the instantaneous values supplied as terms in said equation will cause the indicator to provide an indication of the amount of control necessary on the part of the pilot at that particular instant to satisfy said equation. Another object resides in providing a system of the foregoing character in which the radio receiver is not an essential element thereof.

Still another object resides in providing systems of the foregoing two characters which additionally include an altitude control device and which may, or may not, include a radio receiver adapted to receive radio glide path signals.

Still further objects of my invention reside in providing systems of the foregoing characters in which the radio signals, the altimeter signals and compass signals, either one or more thereof, are limited so as to limit the maximum amount of control dictated by the system.

Still another object resides in providing systems of the foregoing characters in which the manual selector by means of which the pilot adapts the system for a particular chosen flight plan includes interlocks whereby data otherwise available but which should not be employed for any particular selected flight plan cannot be inadvertently supplied to the system.

A still further object resides in providing systems of the foregoing characters which additionally comprise cross-wind compensating means whereby the effects of cross-wind on the operation of the system will be eliminated and the pilot may accurately ascertain the correct crab angle which he must maintain for a predetermined course or bearing.

In fulfillment of still another object, I provide a pitch trim device whereby the system may be compensated for varying angles of attack of the craft under varying loading conditions, and, further, means is preferably provided for automatically eliminating this compensation when using approach or glide path signals.

Other objects and advantages, not at this time more particularly enumerated, will become clearly apparent from the following detailed description of a preferred embodiment of my invention when considered in connection with the accompanying drawings wherein:

Fig. 6 is a further diagram illustrating the operation of my invention when the craft is seeking the glide path beam of an instrument landing radio system.

Figure 1:
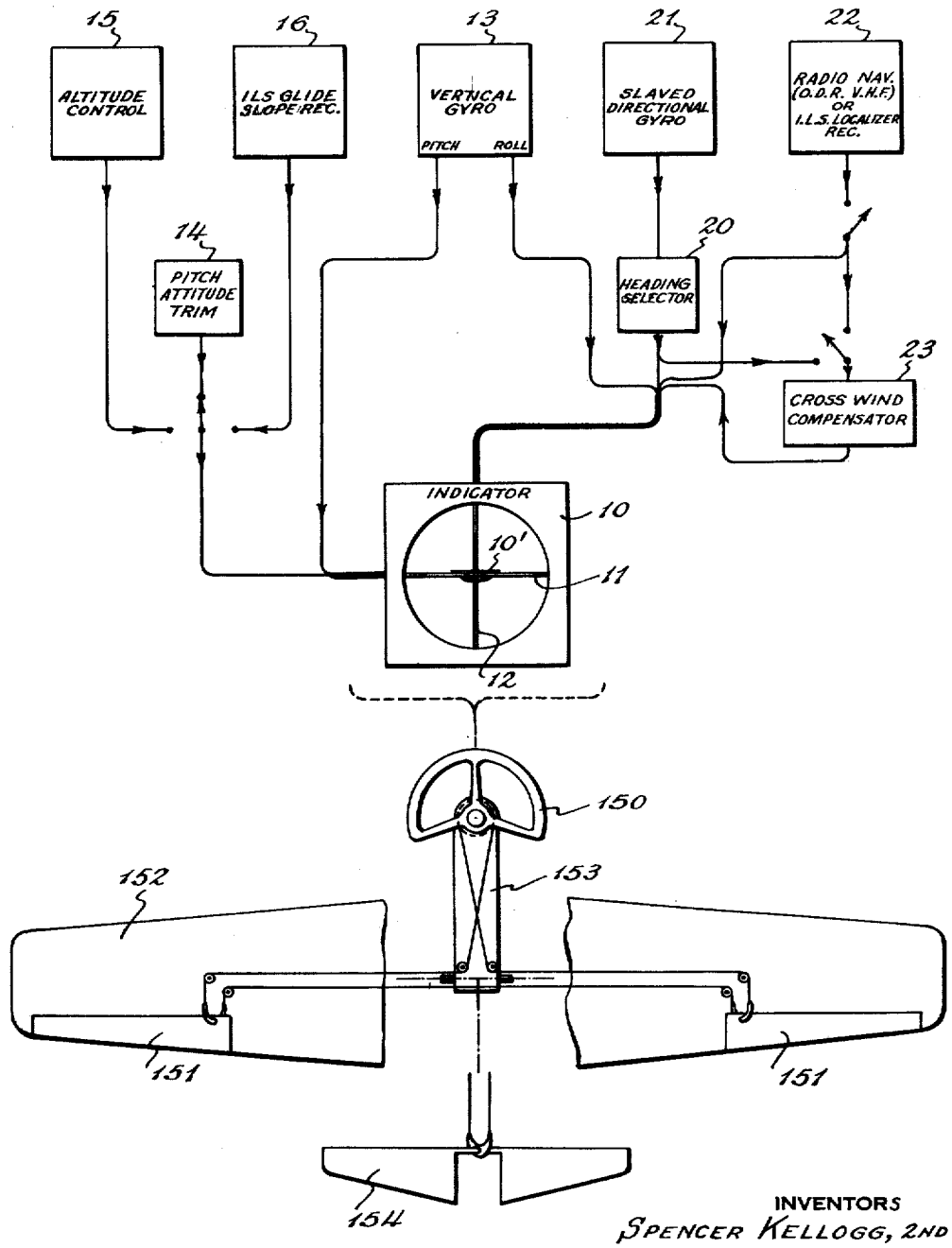
Fig. 1 is a simplified block diagram showing the relationship of the various signals which are applied to the indicating bars of the indicator of my invention.
Figure 2:
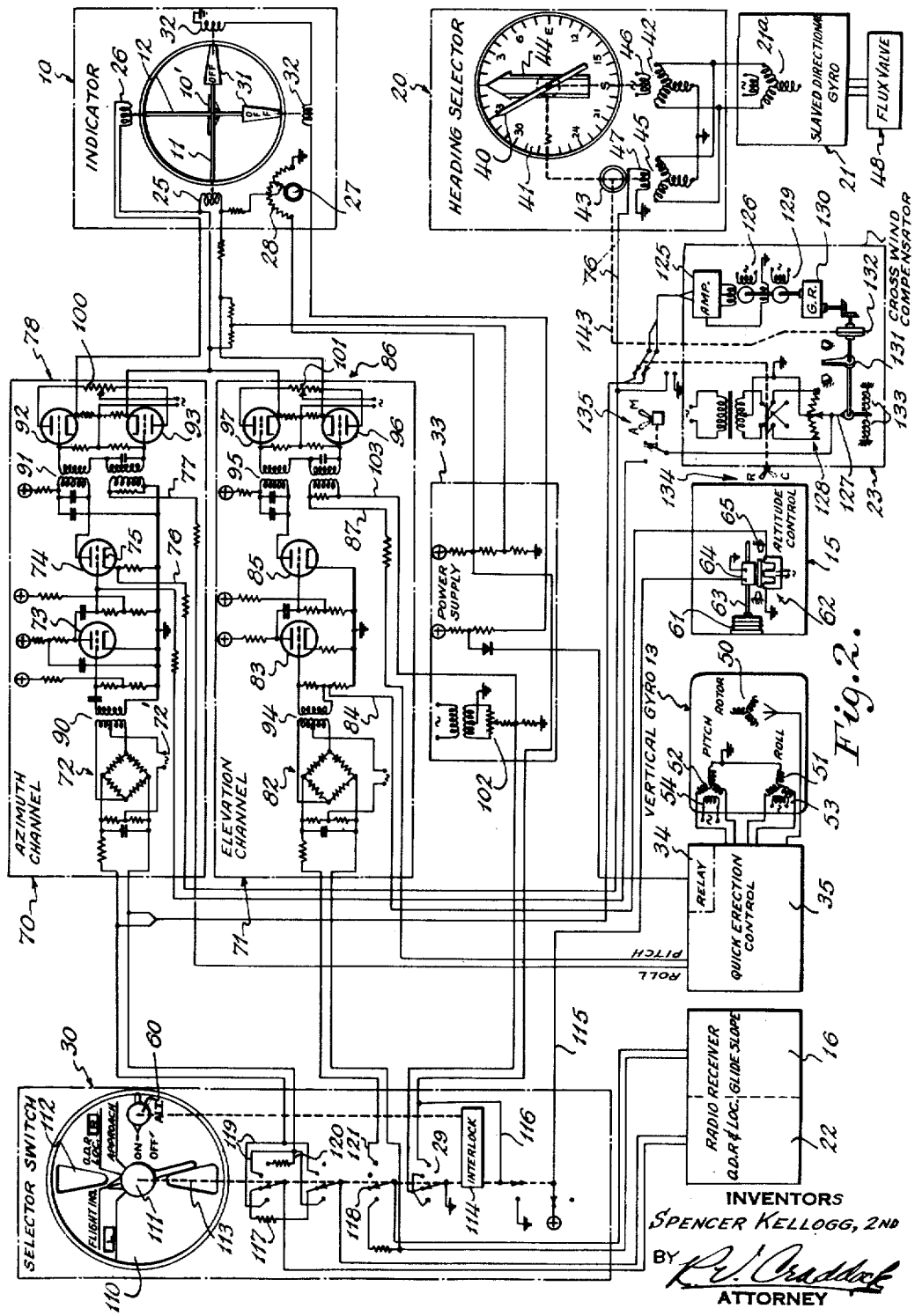
Fig. 2 is a detailed wiring diagram of the complete indicating system.

In the simplified block diagram of Fig. 1 the indicator 10 of my improved indication system is preferably of the cross-pointer type as shown in more detail in the United States Design Patent No. D. 135,322. As more fully illustrated in this patent, the indicator comprises a hemispherically shaped face over which a horizontal bar 11 and vertical bar 12 move in response to received electrical signals. These bars are curved so as to move parallel to the surface of the instrument. Such a configuration presents an ideal indication because the intersection between the bars remain perpendicular throughout substantially the entire range of movement thereof. Preferably, a reference index 10' is provided at the center of the face at the normal or zero position of the indicating bars 11 and 12. However, it is to be understood that other types of indicators may be equally adaptable to my system, such as, for example, a cathode ray tube, the beam-deflecting means of which are controlled by signal voltages in much the same manner as the indicating arms 11 and 12 of the cross-pointer indicator 10.

The horizontal bar of indicator 10 is controlled in accordance with craft pitch attitude signals from a vertical gyro 13, and either a pitch trim signal 14 manually set in from a potentiometer to be hereinafter described, or a displacement signal from either an altitude control 15 or an ILS (Instrument Landing System) glide slope receiver 16. The selection of any one of the latter two signals is made by the pilot in the positioning of the selector switch in accordance with his desired flight plan.

The vertical bar 12 of the indicator 10 is controlled in accordance with yaw signals derived from a heading selector 20 and relayed from a slaved gyro magnetic compass 21. Also the bar 12 is controlled in accordance with a roll signal from the vertical gyro 13, and, when desired, radio signals may be received from the ILS Localizer beam, the Visual-Oral Range, or Omni-Directional Range through a suitable radio receiver 22. The selection of a desired radio signal is made by the pilot also through the operation of the selector switch to be hereinafter more fully described. I may also provide an automatic cross-wind compensator 23 which supplies a signal which automatically biases the bar 12 in one direction or the other to compensate for a heading error resulting from a persistent cross-wind tending to drive the craft off its preselected course or ground track.

The equipment which supplies the above described flight data may be of conventional form. For example, the vertical gyro 13 may be of the type generally employed in automatic pilots which supplies the roll and pitch displacement signals upon changes in roll and pitch attitude of the craft. The device for providing a heading reference may be a slaved directional gyro of the type shown in U. S. Patent No. 2,357,319 issued in the name of O. E. Esval et al. and assigned to the assignee of the present invention. As more fully described in this patent, the slaved gyro magnetic compass comprises a directional gyroscope whose spin axis is stabilized in a horizontal plane by a leveling device and whose orientation in azimuth is slaved to the Earth's magnetic meridian by a field-sensitive device such as a flux valve. The heading selector 20, adaptable for use in the present invention may be of the kind disclosed in U. S. Patent No. 2,415,430, and consists of means for providing a signal proportional to the displacement of the craft in azimuth from a predetermined selected heading. The altitude control mechanism 15 may be of the type disclosed in detail in U. S. Patent No. 2,446,546, wherein a pneumatic bellows positions an element of a signal generator, such as an "E" pick-off, for providing a signal proportional to deviations of the craft from a selected altitude. The radio receivers 16 and 22 are conventional and references to illustrative patents are deemed unnecessary.

The indicator 10 furnishes to the pilot a visual indication of the amount and direction of correction required in flight attitude in order correctly to operate the aircraft with respect to a selected flight plan. When the flight attitude of the aircraft for the selected flight plan is correct, the two bars are centered or zeroed over the index 10' on the hemispherical background of the instrument. Departures from correct flight for the selected plan is indicated by displacement of either or both of the bars from this centered position, the magnitude of such displacement being shown, at any given instant, by the position of the bars with respect to the vertical and horizontal graduations on the background scale. Restoration of the bars to the centered or zeroed position, in response to aircraft changes in attitude, as in roll or pitch, indicates to the pilot that the aircraft has been caused to assume the correct attitude relative to the particular plan. That is, if the aircraft is displaced from a predetermined course but the aircraft attitude has been so adjusted as to zero the indications of the vertical and horizontal bars, the aircraft will approach and thereafter maintain the predetermined course so long as the bars are maintained centered or zeroed.

The horizontal bar 11 and vertical bar 12 may be operated by suitable signal-responsive coils 25 and 26 which are energized by electrical signals derived within the system. The indicator 10 is preferably additionally provided with a pitch attitude trim knob 27 which controls the position of a potentiometer 28. The potentiometer may be adjusted by the pilot to shift the zero position of the horizontal bar 11 of the indicator to compensate for changes from the normal pitch attitude of the aircraft during flight. Such trimming is made inoperative through switch 29 in the selector switch 30 when either the altitude control 15 is on, or when the craft is in final approach as hereinafter described.

The indicator 10 is also provided with a pair of "off" flags 31 visible through the face of the glass, which serve as instrument operating indicators. These flags are controlled by relays 32 connected to the power supply 33 for the system and to a relay 34 in a quick erection control 35, to be hereinafter more fully described. When the two flags are in view they indicate that the system is not operating correctly. This may be because of power failure or from the fact that the quick erection control has not completed its full cycle of operation.

The heading selector or compass 20 repeats the magnetic heading indication provided by the slaved directional gyro or gyro magnetic compass 21 and includes means for setting a particular heading reference into the system. Heading indication is provided by the heading pointer 40 which is read on a course dial 41 suitably graduated in degrees of azimuth. The pointer is actuated by a synchro or Selsyn motor 42 to be hereinafter explained. Heading selection is accomplished by rotating a course setting knob 43 on the face of the heading selector 20. This knob mechanically displaces the course pointer 44 so that any selected heading reference may be established by moving the pointer to a selected graduation of the azimuth scale 41 of the heading selector 20. Simultaneously, the knob 43 displaces the rotor of a heading setter synchro or Selsyn signal generator 45 with respect to its rotor to supply signal voltages proportional to compass error as hereinafter explained. The working components of the heading selector 20 are the heading indicator synchro 42 and the heading setter synchro 45. The rotor 46 of the heading indicating synchro 42 is attached directly to a shaft which rotates pointer 40 relative to the azimuth scale 41. The rotor 47 of the heading setter synchro 45 is fixed to the course indicating pointer 44 thus permitting angular displacement thereof relative to the stator of synchro 45 by rotation of the setting knob 43. The two synchros function in the following manner. The slave directional gyro 21, through its associated signal transmitter 21a which is electrically connected with synchros 42 and 45, creates a resultant magnetic vector in the respective stators of the heading indicating synchro 42 and the heading setter synchro 45. These vectors represent magnetic north as determined by the flux valve 48. The rotor of the heading indicating synchro, being energized with A. C. current, interacts with the flux vector in the stator to displace the pointer 40 relative to the scale 41. Thus, the position of the pointer 40 with respect to the scale 41 represents the magnetic heading of the aircraft relative to north. However, synchro 45 is a signal generator and, if the rotor 47 is displaced relative to the stator 45 from a perpendicular relationship to the stator field, either by manual positioning of the knob or by the motion of the aircraft, the rotor will supply a signal, which is ultimately supplied to control the vertical bar 12 of the indicator 10. The displacement between a selected heading and the actual magnetic heading of the aircraft may be read directly on scale 41.

The vertical gyro incorporated in my indicating system is generally conventional in form and is positioned in the craft so that the roll axis thereof lies parallel with the longitudinal axis of the craft and its pitch axis lies parallel with the lateral axis of the aircraft. The gyro motor may constitute the armature of a three phase induction rotor which spins about a stator winding 50 in suitable bearings in the rotor case. The rotor case in turn is mounted in a surrounding gimbal which is mounted in bearings fixed to the craft thus providing a three axis gyro as is well known. Suitable erection means are provided to maintain the spin axis thereof in a vertical position as is also well known in the art of gyroscopes.

The vertical gyroscope indicated schematically at 13 is provided with a roll pick-off or synchro 51 mounted on its roll axis and a pitch pick-off or synchro 52 mounted on its pitch axis. These synchros when actuated by motion of the aircraft about its roll and pitch axis, supply signals which are proportional to the attitude displacement of the aircraft from straight and level flight. The signals from each of these synchros or signal-generators are ultimately supplied to control the vertical and horizontal bars of the indicator 10, the pitch signal controlling the horizontal bar 11 and the roll signal the vertical bar 12. These signals are algebraically added to other signals in controlling the bars of the indicator and constitute the second term in Equation 1 above and the third term in Equation 2.

In straight and level flight the rotors 53 and 54 of pick-offs 51 and 52, are at their null point with respect to the stators, respectively. Hence, these synchros supply no signals. However, in any other attitude, a signal is induced in the stators which is proportional in magnitude to the degree of aircraft displacement from level flight and the polarity sense or phase of the signal represents the direction of this displacement.

The vertical gyro 13 preferably has associated therewith, a quick-erection control 35 which is fully described in copending application Serial No. 99,636 filed in the name of A. W. Lane and assigned to the assignee of the present invention, now Patent No. 2,567,948 granted September 18, 1951. As more fully described in this copending application, the quick erection control contains a program device which, with its associated electrical components causes the spin axis of the vertical gyro to erect to its normal operating position in a very short period of time after the power to the system has been turned on. This programming device controls the relay 34 which in turn causes flags 31 on indicator 10 to disappear when the quick erector cycle for the vertical gyro is complete.

The altitude control 15 furnishes an altitude error signal which is supplied to control the horizontal bar 11 of the indicator 10 in the event of a departure of the aircraft from a predetermined selected altitude. An altitude reference is established when the altitude knob 60 on the selector switch 30 is turned to the "on" position. As fully described in the above-mentioned Patent No. 2,446,546, all of the components of the altitude control 15 are enclosed in an air tight housing to which is supplied static air pressure from a suitable Pitot tube. Essentially, the altimeter comprises a Sylphon bellows 61 and any suitable type of pick-off such as the "E" type pick-off 62 herein shown. The connection between the bellows 61 and the pick-off armature is established by a suitable rod 63 attached at one end to the bellows and to which the armature is clutched as by a suitable electro-mechanical clutch 64. Therefore, the rod is shiftable relative to the pick-off so that the pick-off may be set at zero signal output for any value of altitude and as the bellows 61 contracts or expands in response to altitude changes, the armature of the "E" pick-off 62 is mechanically shifted back and forth with respect to the field coils thereof which, when energized, will produce a signal in the output windings. The clutch 64 is energized when altitude control knob 60 on selector switch 30 is placed in the "on" position. The altitude control signal is supplied to control the horizontal bar 11 of the indicator 10. The output of the pick-off 62 is preferably limited mechanically by suitable stops 65 so that at either extreme of armature movement the signal does not exceed a predetermined fixed value. When the altitude switch 60 is turned to "off" the engaging coil 64 is deenergized and the armature of the pick-off 62 is centralized by suitable biasing means such as springs, not shown.

The radio receiver portion of my invention, which is provided for receiving transmitted navigational radio signals, may be subdivided, at least for descriptive purposes, generally into two portions. One portion 22 is adapted to receive azimuth signals, such as those derived from radio ranges, O. D. R. (omnidirectional) radio ranges, and I. L. S. (instrument landing system) localizer radio signals. The other portion 16 of the radio receiver is adapted to receive I. L. S. glide slope radio signals and the like. Both receivers are adapted to provide a D. C. output proportional to the magnitude of deviation of the craft from the ground track or radio path defined by the transmitted radio signals.

As above indicated, an amplifier is provided for algebraically combining all of the signals supplied thereto in accordance with some adopted plan of flight and to supply an output which is applied to operate the vertical and horizontal bars of the indicator 10. In other words, the signals supplied to the amplifier constitute the terms of the equation for the system and are supplied thereto in the proper sign called for by the equation such that the amplifier output is proportional to the solution of the equation or the amount of control necessary to satisfy the equation, i. e. to reduce the equation to zero for the present instantaneous values of the terms whereupon ultimately all terms of the equation will reduce to zero. The amplifier comprises generally a power supply section 33 only a very small portion of which is shown in detail, an azimuth channel 70 and an elevation channel 71. Azimuth channel 70 combines and correlates all signals affecting the vertical bar 12 and the elevation channel 71 combines and correlates all of the signals which are employed to control the horizontal bar 11. Thus, azimuth channel is governed by roll, heading, and radio signals and the elevation channel 71 is governed by pitch, altitude, and glide slope signals. The azimuth channel 70 of the amplifier comprises, generally speaking, a modulator 72 for converting the D. C. radio signals into suitable A. C. signals, a first triode stage 73 for amplifying and preferably limiting the modulated radio signal, and a second triode stage 74 for mixing, amplifying and preferably limiting the radio signal and also the heading signal, the latter signal being applied to the cathode 75 of the triode 74 through lead 76 from the rotor 47 of heading setter synchro 45. The output of the tube 74 is applied together with a roll signal appearing on lead 77 from the roll synchro 51 of the vertical gyro to a balanced phase-sensitive demodulator 78. The output of the demodulator 78 is applied directly to the deflection coil 26 of the vertical bar 12 of the indicator 10. The pitch or elevation channel 71 is substantially identical with the azimuth channel 70 and comprises a modulator stage 82 for modulating the D. C. glide slope radio signal to thereby provide a suitable A. C. signal. The triode 83 amplifies and limits the glide slope signal and, alternatively, the altitude error signal appearing on lead 84 and derived from the altitude control 15. A second triode stage 85 is provided for further amplifying and limiting the glide slope signal or altitude error signal. The output stage 85 is applied to the phase sensitive demodulator 86 together with the pitch error signal appearing on lead 87 which is derived from the pitch synchro 52 of the vertical gyro 13. The output of the phase sensitive demodulator 86 is applied directly to the deflecting coil 25 of the horizontal indicating arm 11 of the indicator 10.

With respect to the roll channel, the amplifier functions to compute the equation of the system in the following manner. It receives a D. C. signal proportional to the displacement of the craft from a predetermined radio ground track when the selector switch is positioned for such reception. This D. C. radio input signal enters the modulator, shown as a bridge modulator employing crystal rectifiers, and is modulated with a reference voltage supplied from the power section at 72', with D. C. signal being converted into a corresponding A. C. signal which is supplied as the first term in Equation 2 above. The A. C. signal is coupled through coupling transformer 90 to the grid of triode 73 and therein amplified and so limited that it may be neutralized by a signal developed due to a predetermined angular change in aircraft heading. The limited output of triode 73 is supplied to the grid of triode 74 where it is combined with the heading error signal derived from the heading selector 20 which corresponds to the second term of Equation 2 above, these terms being combined in a subtractive manner. In this stage, the algebraic sum of radio and heading signals (the difference) is amplified and limited so that it may be neutralized by a signal developed by a predetermined angular change in aircraft roll attitude from straight and level flight. The resultant signal or output of triode 74 is applied to a coupling transformer 91 where it is algebraically added to the signal appearing on lead 77 originating in the roll synchro 51 of the vertical gyro 15. The roll signal is supplied to oppose the output of triode 74. The output of transformer 91 is applied to the demodulator 78 which consists of triodes 92 and 93. Therefore, if the output of triode 74, that is, the combined and limited radio and heading signals is not exactly equal to the roll signal on lead 77 the differential current in the demodulator 78 causes the vertical bar 12 of the indicator 10 to deflect in a direction corresponding to the sign of the resultant signal and in an amount proportional to the magnitude thereof. If, however, these signals balance, the bar will remain centered.

The elevation channel 71 operates in a similar manner as the azimuth channel 70 to compute the equation of the system for pitch control, but there are differences depending on whether the glide slope radio receiver 16 or the altitude control 15 is the source of the displacement signal. Assuming that the glide slope receiver 16 is the source of input, the channel 71 receives this D. C. radio input and modulates it in modulator 82, as in the case of modulator 72 in the azimuth channel, and converts the D. C. signal to a corresponding A. C. signal, corresponding in amplitude to the magnitude of the D. C. signal and in phase sense to the polarity of the D. C. signal. Through the coupling transformer 94, this A. C. signal is applied to the triode 83 where it is amplified and the output thereof is applied to the grid of triode 85. In this second stage 85 the signal is limited so that a predetermined change in aircraft pitch attitude from straight and level flight will exactly neutralize it. The output of the amplifier and limiter triode 85 is then applied to the coupling transformer 95. Here the limited radio signal is algebraically added to the pitch signal so as to oppose the pitch signal, the pitch signal being derived by lead 87 from the pitch synchro 52 of the vertical gyro 13. The output of transformer 95 is applied to demodulator triodes 96 and 97. If the glide slope signal and pitch signal equalize each other, the demodulator tubes 96 and 97 will be in balance and no current will flow to the deflection coil 25 of the horizontal arm 11 of indicator 10. However, if the pitch signal and the glide slope signal are not equalized, the demodulator 86 will become unbalanced and a signal will appear across deflection coil 25 and thereby deflect indicator bar 11 in a direction corresponding to the sense of the resultant signal and in an amount proportional to the magnitude thereof.

If the altitude control switch 60 on the selector switch 30 is in the "on" position, the altitude signal from pick-off 62 is applied directly to the grid of triode 83 for amplification. As above stated, signal limiting of the altitude signal occurs mechanically by stops 65 within the altitude control. In all other respects, the signal from the altitude control 15 follows the same path as that from the glide slope receiver and is added algebraically (bucking relation) to the pitch signal derived from the vertical gyro 13. The system is also preferably provided with certain trim adjustments. These trim adjustments are a roll trim, pitch trim and glide slope trim. All trim adjustments are made by the proper positioning of potentiometers. For example, the roll trim potentiometer 100 controls the balance of the output of the demodulator tubes 92 and 93 and the pitch trim potentiometer 101 serves to control the balance of the outputs of the demodulator tubes 96 and 97. Unbalance in the plate currents of the tubes may be corrected for by adjustment of potentiometer 100 and 101, and, also, they may be adjusted for compensation purposes. A third potentiometer 102 modifies the glide slope signal so as to adapt it to the characteristics of a specific aircraft. Thus, when the selector switch is turned to the approach position, the glide slope trim signal derived from potentiometer 102 automatically introduces a trim signal by way of lead 103 to the amplifier 71 so that upon zeroing or centering the arm 11 on the indicator 10 the aircraft will assume the correct pitch attitude for an approach. However, when the selector switch is in any other position this glide slope trim signal is shunted to ground and becomes ineffective.

Further, in accordance with my invention, I provide a selector switch 30 which enables the pilot or operator of the craft to adapt the system to a selected flight plan. For ease of operation, the switch dial 110 is marked with specific legends representing the flight facilities to be used in the chosen flight plan. Indexing of the central selector knob 111 with any selected legends establishes internal electric connections by means of associated switches which allow signals corresponding to particular data only to operate within the system. Rotation of the selector knob furthermore brings into view through two triangular apertures 112 and 113 in the dial 110 an indication of whether the blue-yellow or yellow-blue pattern is being flown, that is, the indication will represent in colors that the blue sector of a radio range lies either to the right or left of the flight path as the case may be. If the selected flight plan is without the aid of radio signals, black appears in the apertures 112 and 113.

Altitude control is introduced into the system by the above-mentioned altitude control knob 60 and to prevent conflicting signals from being simultaneously fed into the system a mechanical interlock 114 is provided. Through this interlock, when the altitude control knob 60 is in the "on" position and the pilot wishes to make a final approach to an airport, rotation of the main control knob 111 to the approach position automatically throws the altitude control knob to its "off" position. With the altitude control knob 60 in the "on" position, it closes circuit 115, to apply an excitation current to the magnetic clutch 64 which operates to clutch the pick-off to the altimeter. Also, when the altitude control is "on," the pitch attitude trim potentiometer 28, associated with the indicator 10, is removed by circuit 116 shorting out its excitation voltage.

The selector knob 111 may be rotated to any one of four positions—flight instruments; Omni Directional Range (O. D. R.)-Localizer Beam (LOC.)—blue right; Omni Directional Range (O. D. R.)-Localizer Beam (LOC.)—blue left; and approach. In the flight instrument position, the indicating system of my invention becomes a gyro-controlled flight instrument independent of radio signals, as illustrated by switch circuit 117 and open contact 118 in the selector switch 30. As such, the heading displacement signal on lead 76 derived from the heading setter synchro 45 and the roll signal on lead 77 derived from the roll synchro 51 of the vertical gyro 13 are supplied to the amplifier 70 to control the vertical bar 12 of the indicator 10. Also, the horizontal bar 11 is controlled by signals derived on lead 87 from the pitch synchro 52 of the vertical gyro 13. This latter signal may be biased according to the pitch trim of the aircraft by the pitch attitude trim potentiometer 28 associated with the indicator 10, as above mentioned. With the selector switch 30 in the flight instrument position the pilot may or may not make use of the altitude control. If the altitude control is "on," its signal is supplied to the amplifier 71, and the trim signal on lead 103 derived from potentiometer 102 is shorted to ground. However, under these conditions, a bias from the pitch attitude trim potentiometer 28 may be obtained.

When the selector switch is rotated to the "O. D. R. localizer-blue left" position, the bars 11 and 12 on the indicator 10 are controlled by the same signals as in the "flight instrument" position and additionally by a radio navigation signal. As above stated, the source of this signal may be a normal approach localizer leg with the blue sector to the pilot's left, or, a visual-oral range, provided the blue sector is on the pilot's left. In the "O. D. R. localizer-blue right" position of the knob, the directional sensing of the radio signals is reversed through circuit 119 as compared to the "blue left" position, so that the vertical bar 12 of the indicator will provide the proper indication when flying a localizer beam with the blue sector to the pilot's right. As an aid to this sensing of the signals, the blue and yellow sectors appear respectively in the apertures 112 and 113, or vice versa as the case may be, in the switch dial 110.

In the "approach" position of the knob, the signals employed in the "O. D. R. localizer" are also used as evidenced by circuit 119 and 120. However, the altitude control signal is replaced by a glide slope signal as evidenced by the circuit 121. In this position of the knob 111, a bias signal from the glide slope trim potentiometer 102 may be obtained from the power section 33 of the amplifier, and the pitch attitude trim signal from potentiometer 27 will be shorted to ground as above described. The glide slope trim bias is made available through operation of switch 29 in the selector switch 30.

The amount of correction or control of the craft as indicated by deflection of the vertical and horizontal bars of the indicator 10 is so limited, as hereinabove described, that at no time will the flight attitude of the aircraft in roll and pitch, when corrected in accordance with the indicated amount, exceed a predetermined maximum value. As stated, the deflection of the vertical bar 12 is controlled by the algebraic sum of bank, stabilized heading, and radio localizer or range beams, so that a full scale deflection of the bar is equal preferably to a predetermined radio signal and a predetermined maximum heading departure. The algebraic sum of heading and radio signals is limited in triode 74 in the azimuth channel 70 of the amplifier so that their individual values or a combination of the two can be cancelled by a predetermined angle of bank. This limitation is performed by the conductive characteristic of triodes 73 and 74. The modulated radio displacement signal is limited by the saturation of triode 73 so that its output to the grid of triode 74 can not go beyond a predetermined value. Similarly, the conductive characteristic of triode 74 prevents the combination of radio displacement and heading signal in its output to increase beyond a predetermined value, which value is determined by the saturation point of the triode 74. The horizontal bar is controlled by the algebraic sum of pitch and glide slope signals when on instrument approach, or by the algebraic sum of pitch and altitude signals when flying with an altitude reference. Here again either glide slope or altitude signal, whichever is employed, is limited by the saturation of triode 85 before being added to the pitch signal, thereby insuring that the maximum permissible pitch angle will not be exceeded. It has been found from flight tests of my system that, for one type of aircraft and by way of example, a maximum radio signal will be equalled by a signal proportional to a 60° heading departure or error and that the combined radio displacement signal and heading departure signal will be equalled by a 20° roll attitude displacement from straight and level flight. Such limitation means that the pilot will not be called upon to cause the craft to approach a radio beam at an angle greater than 60° and, in attaining this 60° approach angle, he need not exceed a bank angle of 20°, while maintaining the vertical bar centered or zeroed. Further, by way of example, a signal proportional to a 6° pitch angle from level attitude may be arranged to cancel a full scale radio signal. If, on the other hand, the altitude control is the source of pitch signal, it is desirable that a plus or minus one degree change in pitch attitude should cancel an approximate 20 ft. error in altitude. Also, I prefer that a plus or minus 120 ft. error will furnish a maximum deflection of the horizontal bar 11 from its zero position in either direction and that the 6° maximum pitch attitude change, nose up or nose down, will cancel such full scale deflection. This means that in the case of a craft flying below the glide slope beam, the system will indicate a correction of the craft not to exceed a 6° nose up attitude, or, if an error in altitude of more than 120 ft. is present, the 6° pitch attitude of the craft need not be exceeded in order to center or zero the horizontal bar 11 on the indicator 10. The foregoing values are exemplary and may be varied to suit particular types of aircraft.

The aircraft control and navigation aid of my invention further preferably includes means for correcting for cross wind conditions while flying a prescribed radio course, such as the above-described radio ranges and instrument landing radio beam. Such compensation may be made either manually by the pilot through manipulation of the heading selector, or automatically through the cross wind compensator 23. The system also provides for flying a prescribed magnetic course with greater accuracy.

Generally speaking, the compensator 23 is an integrating system which integrates an error signal proportional to the direction and magnitude of displacement of the craft from a predetermined course caused by a cross wind blowing the craft off the said course. This error signal is integrated and applied to control the vertical bar 12 of the indicator 10 through the azimuth channel 78 of the amplifier. The compensator consists, generally speaking, of an amplifier 125 for receiving and amplifying the error signal from either the compass 20 or radio receiver 22. The output of amplifier 125 operates a motor 126 which in turn displaces the wiper 127 of a potentiometer 128. A speed generator 129 is provided for generating a velocity feed back signal for producing good linear speed response of the motor with signal input. A gear reduction mechanism 130 reduces the displacements of the wiper 127 to small angular displacements proportional to the rotation of the motor shaft. A limit stop mechanism 131 preferably limits the magnitude of the integral signal derived from the wiper 127 to a predetermined quantity which in turn controls the amount of additional movement of the vertical bar 12 of the indicator 10 to be hereinafter more fully described. The compensator 23 is further provided with a clutch 132 under the control of the pilot's selector knob 43 so that if the heading is reset, the integration signal is erased, through centralizing springs 133 on wiper 127. The connection between knob 23 and clutch 132 is represented by the dash line 143. A switch 134 is provided for reversing the sense of the integration signal depending upon whether the pilot is flying a radio course or a compass course. Another switch 135 is provided for enabling the pilot to effect cross wind compensation either manually or by automatic means.

The operation of the system of my invention will now be described in detail. The vertical bar 12 of the indicator 10 is controlled by radio displacement signals (s) and/or yaw or compass signals $$\left(\frac{ds}{dt}\right)$$

and roll attitude signals $$\left(\frac{n_s}{dt^2}\right)$$

while the horizontal bar 11 is controlled by radio displacement signals or altitude signals (s) and pitch attitude signals $$\left(\frac{ds}{dt}\right)$$

These two bars will remain zeroed or centered on the reference index 10' of the meter 10 only when the algebraic sum of the displacement and/or compass and attitude signals equals zero. First, and for a simple example, if the aircraft is displaced from a desired flight path, the resulting displacement signal will cause a bar deflection proportional, within the above stated limits, to the amount of the displacement. To return the aircraft to the desired flight path, its attitude only is controlled in accordance with the indicated amount of necessary control, the amount of attitude correction being proportional, within the above stated limits, to the amount of the displacement, considering radio signals alone. As the attitude change is effected, an attitude signal is applied to the bar tending to return it to its zero position. When the attitude of the airplane has been corrected to the proper extent, the attitude signal will equal the displacement signal, and the bar will return to its zero position. As the aircraft is turned toward the desired flight path, the displacement signal gradually decreases in magnitude. To keep the bar at zero, the attitude signal must also be correspondingly decreased by gradually returning the aircraft to normal level flight attitude. Thus, by keeping the bar zeroed or at its zero position, the aircraft will be caused to return to the desired flight path smoothly and without overshooting or hunting.

From the above, it will be noted that the intersection of the bars 11 and 12 on the indicator 10 will remain zeroed by proper control of the attitude of the craft when either of the two following conditions exists, first when the aircraft is on the desired flight path and its attitude and heading are such as to keep it on such path, and, secondly, when the aircraft is displaced from the desired flight path but its attitude and heading are such as to return it in a correct manner to such path. Whenever either bar on the indicator 10 moves away from reference position 10', the pilot need only maneuver the airplane in pitch and/or roll to return the bar to the reference or zero position. Upon execution of such a maneuver, the bar returns immediately to zero with no anticipation being required of the pilot and with no overswing or hunting. In other words, the need for interpretation, anticipation, and bracketing of a signal path, all of which require a great amount of experience and skill on the part of the pilot, has been eliminated by my novel system.

In the following paragraphs the operation of the instrument will be described with respect to various available flight plans. The first of these is its use as a flight instrument without the aid of radio navigational information as illustrated in Fig. 3.

If it is desired to fly the craft by "dead-reckoning" the pilot moves the selector knob 111 on switch 30 to the "Flight Instrument" position on the switch face 110. In this position the vertical bar 12 of the indicator 10 is controlled by signals from roll and heading of the craft and the horizontal bar 11 is controlled by craft pitch signals because the radio signals are shorted out in circuits 117 and 118. If, however, the pilot has set altitude control knob 60 to the "on" position, an altitude signal is also supplied to control the horizontal bar 11. Under these conditions, if the craft is flying straight and level on the desired magnetic heading selected on the Heading Selector 20 and at the desired altitude, the vertical and horizontal bars will be centered at the reference position 10' as shown at D in Fig. 3. If, for any reason, the craft is rolled to the left or right the vertical bar 12 will move to the right or left of the reference index 10' in response to signals from the roll synchro 51 on the vertical gyro 13. Also, if the craft pitches up or down, the horizontal bar 11 will move down or up in response to signals from the pitch synchro 52 on the gyro vertical 13. Correct changes in roll and pitch of the craft in a direction toward the displaced bars will recenter the same.

Figure 3:
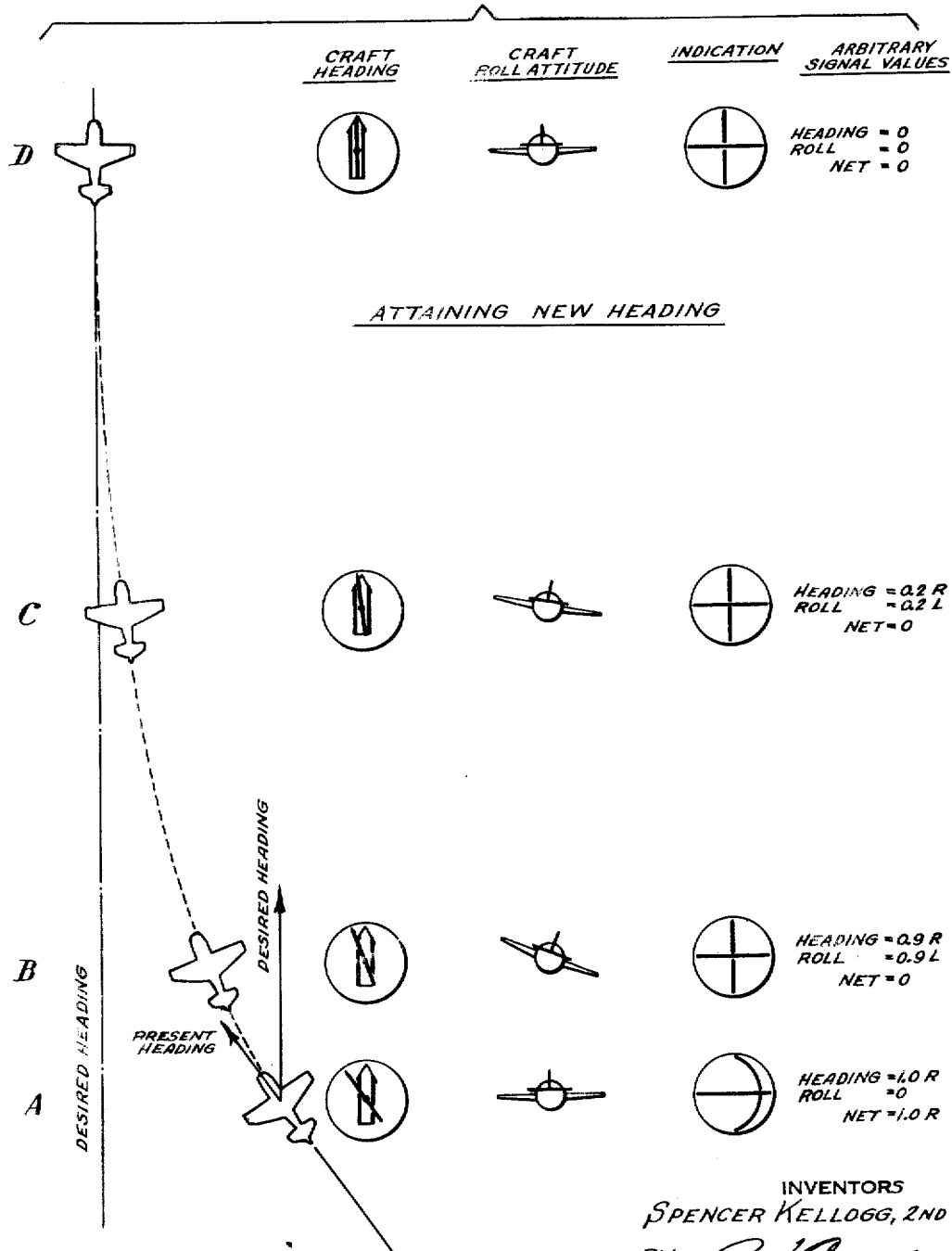
Fig. 3 is a diagram illustrating the principles of my invention when the craft is attaining a new selected heading.

Let us assume now that it is desired to fly a new course which is clockwise relative to the present course as illustrated in Fig. 3. This new course is set in by rotating the heading selector knob 43 to the desired new heading and, on such rotation, a signal corresponding to the magnitude of the angle between the present heading and the new heading is supplied from winding 47 of heading setter synchro 45. This signal immediately displaces the vertical bar 12 to the right as shown at A in Fig. 3. Then, to achieve the new heading, the pilot merely rolls the craft in bank to the right until the vertical bar 12 is again centered over the reference index 10'. As the craft rolls, a bank angle signal is produced in the roll synchro 52 of the vertical gyro 13 which signal is applied in a sense to neutralize the heading error signal. Such a condition is shown at B in Fig. 3. It must be noted that if the new heading is more than, let us assume, 60 degrees away from the present heading, the heading signal on lead 76 is limited in tube 74 of the amplifier 70 such that a predesigned, limited bank angle signal such, for example, as a 20 degree bank angle signal on lead 77 will exactly equal or neutralize it. Thus, by such limitation it will be seen that a predetermined maximum bank angle will not be exceeded, regardless of how large the heading error signal may be, so long as the pilot controls the craft in accordance with the control information derived from the present system.

As the craft turns toward the desired new heading, the heading signal will decrease and therefore, in order to keep the vertical bar 12 at a zero position, the bank angle of the craft must also be reduced. This is illustrated at C in Fig. 3. By following the vertical bar 12 with the controls, the craft will arrive "dead beat" on and maintain the selected new heading as at D in Fig. 3. The exact same series of events occurs when turning to the left but, of course, the signals applied to the indicator 10 are in an opposite sense.

Figure 4:
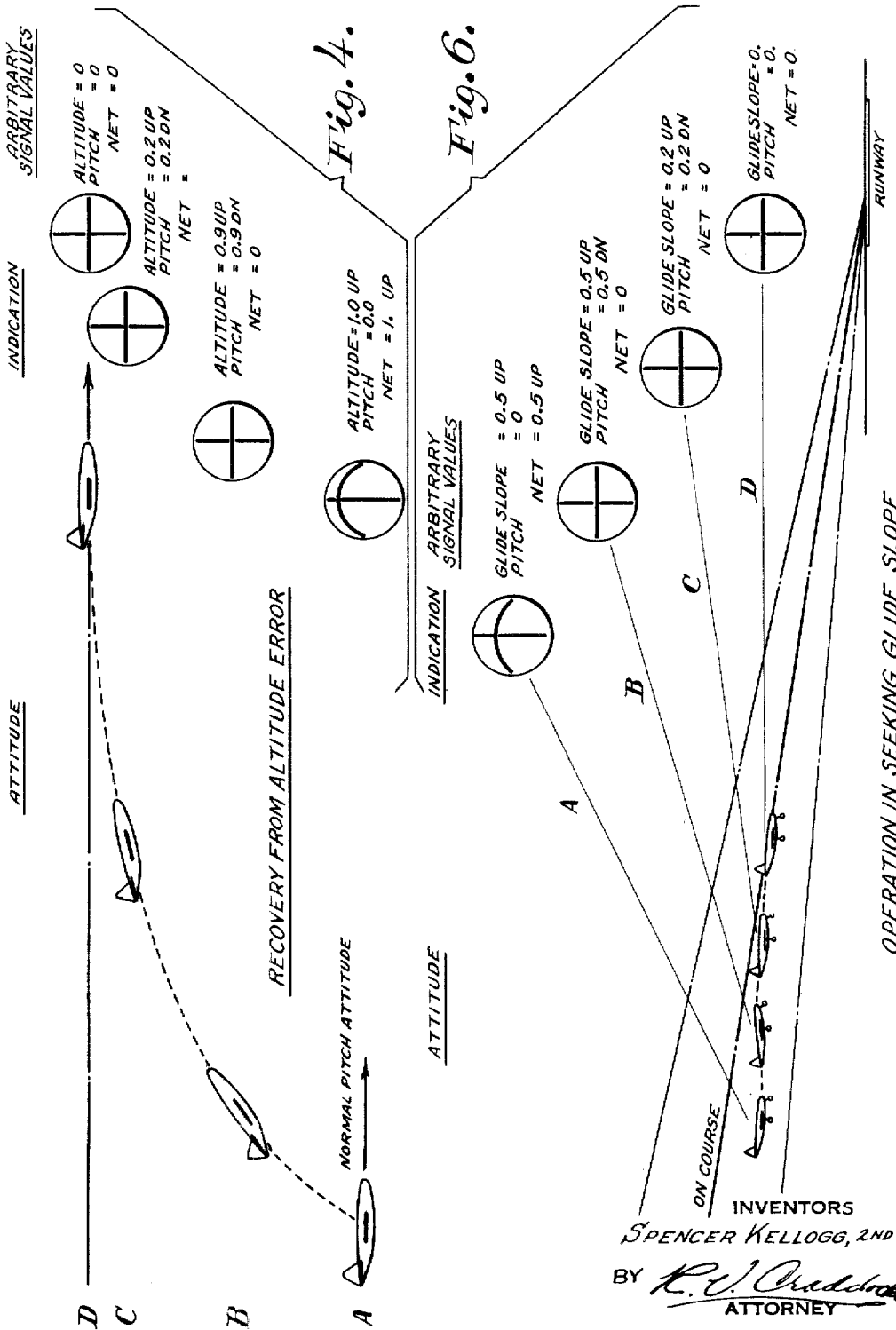
Fig. 4 is a diagram illustrating the use of my invention when the craft is recovering from an altitude error.

If, during flight, the craft loses altitude, recovery from such altitude error is as follows, reference being made to Fig. 4. Upon displacement in a downward direction of the craft from the selected altitude, the horizontal bar 11 deflects upward indicating to the pilot that he must "fly up" to attain the selected altitude as shown at A. The altitude error signal originating in the pick-off 62 of the altitude control 15 is applied by lead 84 to the amplifier 71 which in turn deflects the horizontal bar 11. As the aircraft is nosed upward a signal is supplied from the pitch synchro 52 of the vertical gyro 13 and is applied to the amplifier in a sense to return the horizontal bar 11 toward the reference position 10', as shown at B. Here again, the altitude error signal is limited by limit stops 65 in the altitude control so that a predetermined maximum pitch angle and, therefore, the corresponding pitch signal will exactly zero or neutralize the altitude error signal. A maximum angle of 6° of pitch has been found satisfactory. As the aircraft approaches the desired altitude, the altitude signal decreases and therefore the pitch signal must also be decreased in order to maintain the bar 11 at zero. This process continues smoothly until the aircraft arrives "dead-beat" at the original altitude. If the departure of the craft is upward from the selected altitude the bar is recentered by a similar control but in an opposite sense.

Figure 5:
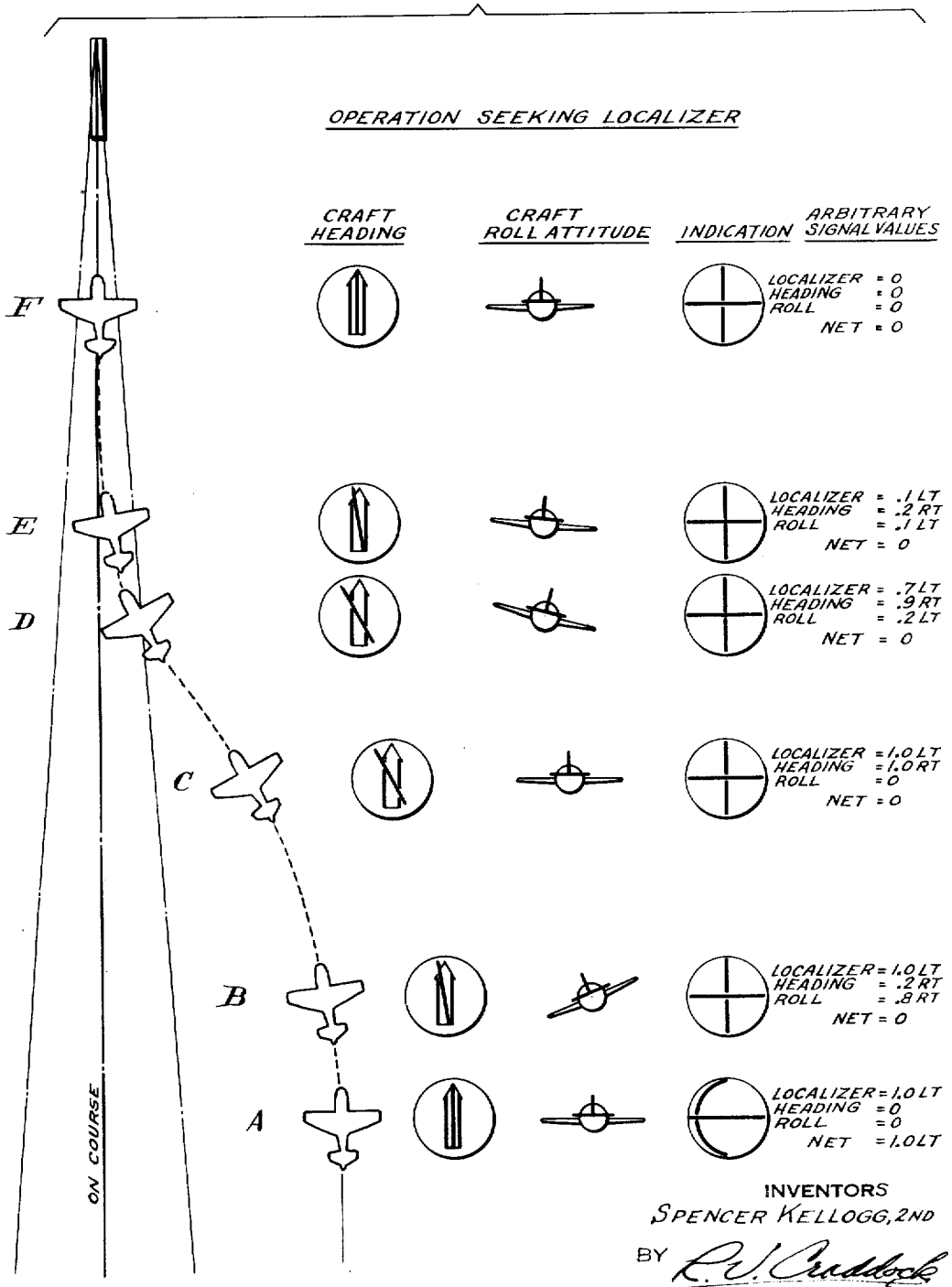
Fig. 5 is another diagram illustrating the operation of my invention when the craft is seeking a localizer beam of an instrument landing system.

When it is desired to use my flight indicating system as a radio navigation instrument, the selector knob 111 of the selector switch 30 is set to the Omni Directional Range (O. D. R.)-Localizer Beam (LOC.)-blue right or blue left position. In this position a radio beam signal, as selected by the radio receiver, also controls the vertical bar 12 so that it is now actuated by roll, heading, and radio signals. If, for example, the radio beam has an azimuthal orientation of zero degrees or North as in Fig. 5, this beam heading is set into the heading selector. Let us suppose then that the craft is flying at this heading, that is, the heading of the radio beam, but it is displaced to the right thereof and in normal straight and level flight. Under such conditions, the vertical bar 12 will indicate a large "fly left" signal, that is, the bar will be deflected far to the left of the reference index 10', as illustrated at A in Fig. 5. As above, the pilot rolls or banks the craft to effect a left turn and immediately the bar will return to its zero position when the correct bank angle is achieved, as above described. As a result of banking, the craft turns and the heading error signal increases, so that, in order to maintain the bar 12 on the reference index 10', the roll attitude of the craft must be decreased as shown at B. It will be noted that at C in Fig. 5 the heading signal exactly cancels the radio signal which indicates that the craft is in straight and level flight at an approach angle which will intercept the radio beam. The signals operating within the system at this point are as follows: Assuming an undesirably large radio signal is applied to the amplifier 70, this signal is limited to some predetermined value in tube 73. The limited output of tube 73 is applied to tube 74 where it is mixed with the heading signal appearing on lead 76 from the heading selector 20. Assuming straight and level approach with zero bank as at C, these signals will be equal and opposite and the output of the demodulator stage 78 will be zero and the vertical bar 12 will overlie the reference index 10'. It will be seen that the degree of limitation of radio displacement signal determines the maximum approach angle to the radio beam and also that the degree of limitation of the radio and heading signals in tube 74 determines the maximum bank angle of the craft. As the craft enters the radio beam, as shown at D, the localizer signal will begin to decrease and such a decrease will produce a resultant signal moving the vertical bar 12 to the right of index 10'. Such deflection indicates that a roll or bank of the craft to effect a right turn is required. As the craft rolls to the right and a right turn takes place, the heading signal begins to decrease. As the approach continues, the roll of the craft must be decreased and eventually all signals operating the vertical bar 12 will decrease to zero when the craft is on the radio course, as at F. The amount of craft control computed by my system from radio, heading, and roll signals, enables a pilot to fly the aircraft along a path producing an asymptotic approach to the radio beam.

An approach to the radio beam from the left is achieved in a similar manner as above described except that the signals are reversed in sense.

The colored coding of the selector switch must now be considered. For example, if the blue sector of the radio range is to the right of the craft as determined by standard airways maps, the selector switch must be set to the "blue right" position. However, if the blue sector is to the left of the craft, the selector switch must be set to the "blue left" position.

The operation of the system when used as an instrument landing system is exactly the same as when used as a radio navigation instrument so far as azimuth control is concerned. However, its operation on glide slope signals should be described, reference being made to Fig. 6 of the drawings. To make an approach to a runway using an instrument landing system the craft is flown at an altitude which will intercept the glide slope beam at some safe distance away from the end of the runway. When the glide slope beam is intercepted, the selector knob 111 on the selector switch 30 is set to the "Approach" position. When the knob is so moved, the altitude control is automatically disconnected by the interlock 114 and the glide slope radio signal is substituted therefor to control the horizontal bar 11 of the indicator 10. At the same time, a bias from potentiometer 102 in the power supply 33 for the amplifier may be added, through switch 29, to the pitch signal so that the indicator 10 will indicate zero pitch attitude when that particular pitch angle which the airplane should assume if descent on the glide slope is achieved. The operation of the instrument on the glide slope is similar to its operation when recovering from an altitude error with the altitude control on. If, for example, in the A position of the craft in Fig. 6, the craft is below the glide slope radio beam, the glide slope signal causes the horizontal bar 11 to deflect upwardly denoting a "fly up" pitch attitude. To correct for this error the craft is pitched upwardly and the pitch signal from the vertical gyro causes the bar 11 to return to zero as at B (note the associated instrument representation). At C the glide slope error signal has been reduced and, therefore, in order to maintain the horizontal bar 11 on the reference index, the pitch attitude must be adjusted, that is reduced. At D in Fig. 6 the craft is on the glide slope path at the proper glide slope pitch angle and the resultant signal which controls the horizontal bar 11 is again zero.

Figure 7:
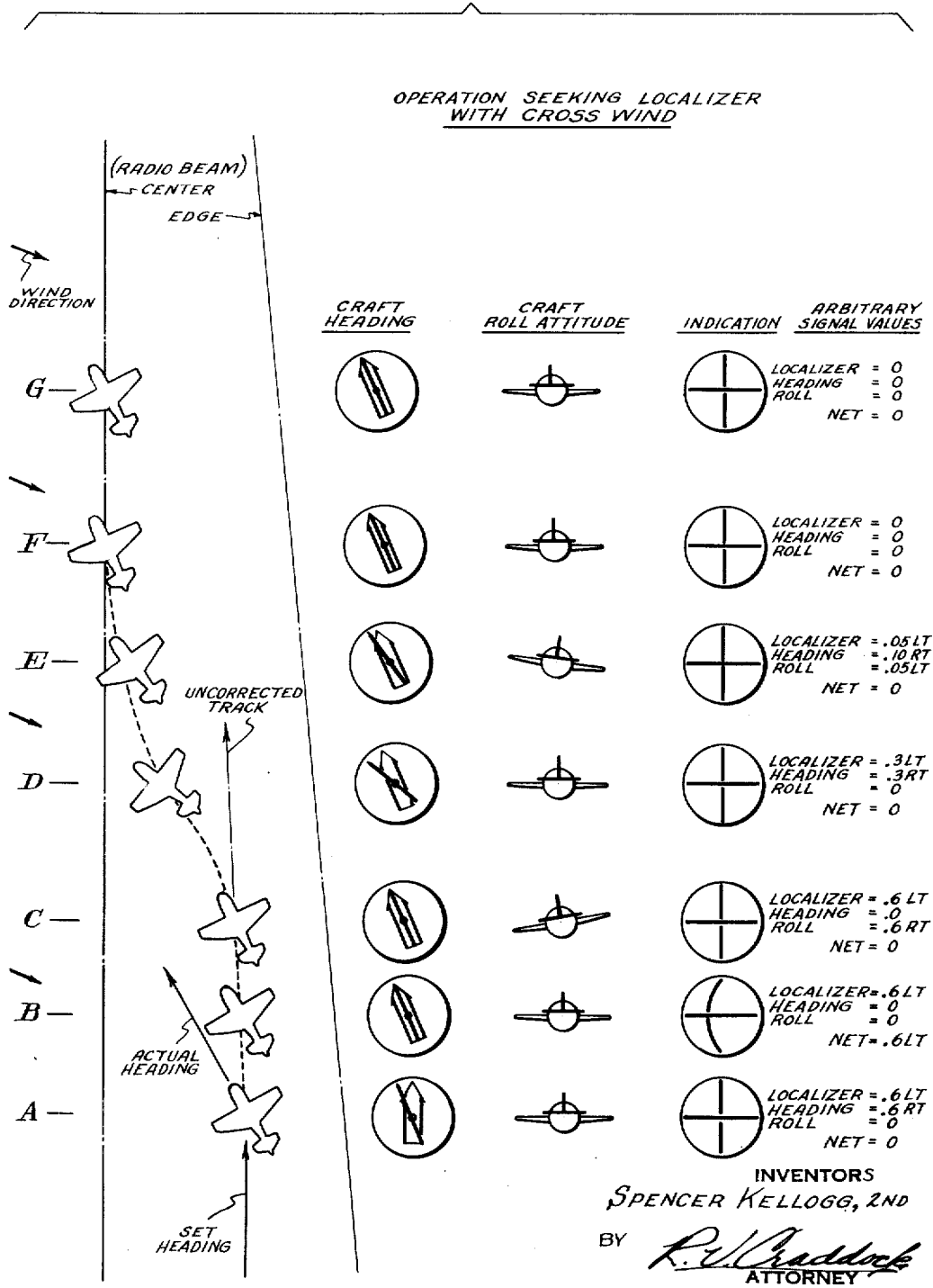
Fig. 7 is a diagram illustrating the operation of my invention in a craft seeking the localizer beam of an instrument landing system when a cross wind is present.

As above stated, compensation for cross wind may be achieved either manually or automatically depending upon the position of the switch 135. If compensation for cross wind is to be made manually, switch 135 is thrown to the right so that no integral signal is supplied to the indicator 10. Under such conditions the aircraft may fly on the down wind side of the radio beam with a constant angular displacement therefrom as indicated at A in Fig. 7. It will be noted that the vertical bar 12 is coincident with the reference position 10' and yet there is a radio displacement error. The amount of this displacement is determined by craft speed, velocity of the cross wind, and the ratio of heading signal to radio signal. The erroneous zero indication of the indicator 10 is caused by the fact that the actual magnetic heading does not coincide with the no-wind heading so that in attempting to maintain a preset heading the craft will drift to the down wind side of the beam and, as it drifts, the radio signal from the radio beam calls for a "fly right" or "fly left" control, as the case may be, until the heading error equals the crab angle. In Fig. 7, the cross wind is indicated as coming from the left and the craft therefore has a left crab angle for a displacement to the right of the radio beam.

This left cross wind is indicated by the departure of the heading pointer 40 from the course index 44 while the vertical bar 12 of the indicator remains at zero (see A in Fig. 7). The discrepancy between the heading pointer and the course index is a direct measure of the crab angle in degrees. After allowing time for this crab angle to be clearly established, the pilot rotates the course setting knob 43 until the course index agrees and is aligned with the heading pointer 40. A signal is therefore produced in lead 76 which deflects the vertical bar 12 to the left calling for a left bank attitude to erase the deflection (see B in Fig. 7). Thereafter, by controlling the roll of the craft as at C, D and E, as in the case of flying a radio beam with no cross wind, the craft travels along a smooth path to approach and maintain, without hunting or overshooting, the center of the beam and with the proper crab angle for the existing cross wind.

If the pilot desires to have the cross wind compensation performed automatically, switch 135 is thrown to the left which introduces a cross wind correcting signal to the vertical bar 12 of the indicator 10 in the following manner. This signal may be derived from integrating either the radio error signal or the compass error signal. Let us assume that the radio error signal, resulting from a cross wind blowing the craft off course, is applied to amplifier 125 in the cross wind compensator 23. The output of this amplifier causes motor 126 to rotate at a controlled speed, through gear reduction mechanism 130 and clutch 132, to adjust the position of wiper 127 on potentiometer 128, the winding thereof being energized from a suitable A. C. source so that the signal derived therefrom may be combined in the azimuth amplifier 70. Such displacement of the wiper 127 represents a time integral of the input radio error (or the compass error as the case may be) and further controls the vertical bar 12 of the indicator 10 through the amplifier 70. As shown at A in Fig. 7, with the craft blown to the right of the radio course, the integral signal will be in such a sense as to cause the vertical bar 12 to deflect to the left indicating a "fly left" attitude. Zeroing the vertical bar by a roll of the craft to the left, as at "C" in Fig. 7, causes the craft to return to the radio beam thus reducing the radio error. However, when the craft attains the beam the heading error will be substantially proportional to or equal to the integral signal and the heading error will equal the correct crab angle. The craft may, under certain circumstances, fly through the beam and an opposite radio error will drive the wiper 127 in the opposite direction thereby reducing the integral signal. By proper selection of the integral signal time constant, this overshoot may be accurately controlled and the craft will settle on course with a crab angle equal to the integral signal. In a similar way, an additional control signal proportional to the time integral of course error may be employed. In its broader aspects the time integral system of cross wind correction is claimed in copending application of Orland Esval, application 293,527, for Blind Landing Indicator and Controller for Aircraft, filed June 14, 1952 (which is a division of prior application 726,605, filed February 5, 1947 and assigned to a common assignee).

The limit stop mechanism 131 limits the magnitude of the integral signal so that if the compensator or integrator 23 is turned on while the craft is initially approaching the radio course the amount of overshoot is limited and the time for the craft to correct for the overshoot is also controlled. In this way no matter how long it takes the craft to approach the radio beam the overshoot and settling time will remain within prescribed limits.

The cross wind compensator 23 may be used to enable the pilot to fly his craft on flight instruments with extreme accuracy. Under such conditions switch 134 is thrown downwardly thus reversing the sense of the integral signal. The operation of the system in flying a magnetic course with cross wind compensation is very similar to the operation thereof in flying a radio course. For example, if it is desired to fly a particular magnetic heading but the loading of the aircraft or tendency of the pilot to fly with a wing down produces an attitude error, a course other than the desired course would be flown. However, this error would be integrated or averaged and the time integral or averaging signal would tend to move the vertical bar 12 in a direction to cause the pilot to correct his attitude and therefore the resulting heading error. Until the desired magnetic course is actually flown there will continue to be a correction signal or integral signal affecting the indicator.

From the above description of the control and navigation instrument of my invention, it will be seen that I have provided a versatile instrument which may fit and be aptly applied to several plans of flight, such as cross country flying using basic flight instruments, or, along predetermined courses determined by radio navigation aids, or, for landing the craft with the aid of instrument landing radio systems under adverse weather conditions. By merely controlling the craft to maintain the vertical and horizontal bars of the cross pointer indicator 10 on the reference index 10' the craft may be controlled to maintain any preselected flight plan.

From the foregoing, it will be observed that my invention functions as a computing mechanism providing, from data supplied thereto, an indication to the pilot of exactly the correct amount of control required to provide proper piloting of the craft. My system solves for an otherwise unknown term in the dynamic equation for the craft and the pilot controls the craft in accordance with this information thereby satisfying the equation, and, so long as he maintains it satisfied, all terms will eventually reduce to zero which is the desired result. Where the initial error is not too large, it will be reduced to zero in an asymptotic manner. The data supplied as terms in the equation computed by the system comprises the radio signal which is supplied as the first term in Equation 2 above and the compass signal constitutes the second term or the first time derivative term therein. The system computes the third term or the second time derivative term. The second term in the equation of the servo loop corresponds to a rate term and the third term to an acceleration term. The third term is the one solved for by the system and which controls the meter. If the pilot then so controls the bank or pitch of the craft as to zero the meter, he is, in effect, putting into the computer a value proportional to the amount he has so controlled the craft as the third or acceleration term of the equation. The craft or servo loop is controlled, under these circumstances, in accordance with the acceleration term of the equation therefor, the value of which is computed in the system of my invention. In other words in Equation 2 above—

$s =$ radio error;

$\frac{ds}{dt} =$ compass error;

$\frac{d^2s}{dt^2} =$ bank angle of craft = control amount.

If a compass course is to be flown, then in Equation 1 above—

$s =$ compass error;

$\frac{ds}{dt} =$ bank angle of craft = control amount.

In the case of altitude control, then in Equation 1 above—

$s =$ altitude error, or, glide slope error;

$\frac{ds}{dt} =$ pitch angle = control amount.

It will be seen that in all cases, the amount of control necessary on the part of the pilot is proportional to a time derivative term in Equation 1 or 2, as the case may be, which is solved for by my system on the basis of input data. The terms, so computed, correspond to bank or pitch angle, as the case may be. Hence, the pilot need only control the craft in pitch and roll to the extent of zeroing the cross pointers of the indicator in order to effect correct navigation.

In accordance with the present invention, only the attitude of the craft is controlled in accordance with the output of the computing mechanism, or, in accordance with the meter indication, in order to cause the craft to follow some preselected flight plan. It will be seen that the control of the craft in pitch is, for all intents and purposes, equivalent to control in roll. Hence, it will be understood that where I make reference in the present specification and claims to control of the bank angle, or control in roll, of the craft that this term is intended to cover a similar control in pitch, unless specific reference to signals limiting the control operation to an azimuth or roll control clearly indicates a limited use of this terminology.

In Fig. 1 I have illustrated apparatus for controlling the pitch and roll attitude of the craft as called for by movements of the indicator 10. This control is of conventional form and comprises a steering wheel 150 and stick 153 which control, through suitable cables, the aileron sections 151 in the wing 152 of the craft and the elevator 154 respectively. Thus the pilot can, by operating these controls, adjust the roll and pitch attitude of the craft in accordance with the amount of control indicated by the indicator 10.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

I claim:

1. A navigating system for aircraft whereby the craft may be caused to approach and thereafter maintain a chosen course, said system comprising means for obtaining a signal proportional to the error between the present craft course and the desired course, means for limiting the maximum value of said signal to some predetermined value whereby to limit the angle of approach of the craft when operated in accordance with said signal, means for obtaining a signal corresponding to the angle of bank of the craft, and means connected to receive said signals for supplying an output proportional to the algebraic sum thereof.

2. A navigating system for aircraft whereby the craft may be caused to approach and thereafter maintain a chosen course, said system comprising means for obtaining a signal proportional to the displacement of said craft from a chosen ground track reference, means for obtaining a signal proportional to the angle between the direction of flight of said aircraft and the bearing of said ground track, means for limiting the maximum value of said signal to some predetermined value whereby to limit the angle of approach of the craft when operated in accordance with said signal, means for obtaining a signal proportional to the angle of bank of the craft, and means connected to receive said signals for supplying an output proportional to the algebraic sum thereof.

3. A system of the character recited in claim 2 further including a zero reading meter connected to receive said output that is proportional to the algebraic sum of the signals.

4. In a craft navigation aid of the character described, the combination with an indicator having a reference position and a movable element normally coincident therewith and actuating means for moving said element relative thereto, means for providing a signal having a value determined by deviation of said craft from a predetermined heading, means for limiting the maximum value of said signal to some predetermined value whereby to limit the angle of approach of the craft when operated in accordance with said signal, means for providing a signal having a value determined by the roll attitude of said craft, means for algebraically combining said deviation and roll signals, and means for supplying the resultant of said signals to said actuating means, whereby said indicator will be maintained substantially coincident with said reference position when the roll attitude of the craft is so adjusted as to cause the craft to return to and thereafter maintain said predetermined heading.

5. In a craft navigation aid of the character described, the combination with an indicator having a reference position and a movable element normally coincident therewith and actuating means for moving said element relative thereto, means for providing a first signal having a value determined by craft displacement from a prescribed ground track, means for limiting the maximum value of said first signal to some predetermined value whereby to limit the angle of approach of the craft when operated in accordance with said signal, means for providing a second signal having a value dependent upon the direction of craft approach toward said ground track, means for limiting the maximum value of said second signal to some predetermined value whereby the craft may be operated to approach said ground track at an angle prescribed by the limited first signal, means for providing a third signal having a value determined by the roll attitude of said craft, means for algebraically combining said first, second and third signals and means for supplying the resultant of said signals to said actuating means, whereby said indicator will be maintained substantially coincident with said reference position when the roll attitude of said craft is so adjusted as to cause the craft correctly to approach and thereafter maintain said track.

6. In a craft navigation aid of the character described, the combination with an indicator having a reference position and a movable element normally coincident therewith and actuating means for moving said element relative thereto, means for providing a first signal having a value determined by craft displacement from a prescribed ground track, means for providing a second signal having a value dependent upon the angle between the direction of craft approach toward said ground track and said ground track, means for limiting the maximum value of said first and second signals to some predetermined value whereby to limit the angle of approach of the craft when operated in accordance with said signals, means for providing a third signal having a value determined by the roll attitude of said craft, means for algebraically combining said first, second and third signals and means for supplying the resultant of said signals to said actuating means, whereby said indicator will be maintained substantially coincident with said reference position when the roll attitude of said craft is so adjusted as to cause said craft to approach and maintain said track.

7. In a craft navigation aid of the character described, the combination with an indicator having a reference position and a movable element normally coincident therewith and actuating means for moving said element relative thereto, means for providing a first signal having a value determined by craft displacement from a prescribed ground track, means for providing a second signal having a value dependent upon the angle between the direction of craft approach toward said ground track and said ground track, means for limiting the maximum value of said first signal to some predetermined value whereby to limit the angle of approach of the craft when operated in accordance with said signal, means for providing a third signal having a value determined by the roll attitude of said craft, means for algebraically combining said first, second and third signals and means for supplying the resultant of said signals to said actuating means, whereby said indicator will be maintained substantially coincident with said reference position when the roll attitude of said craft is so adjusted as to cause said craft to correctly approach and thereafter maintain said ground track.

8. In a craft navigation aid of the character described, the combination with an indicator having a reference position and a movable element normally coincident therewith and actuated means for moving said element relative thereto, means for providing a first signal having a value determined by craft displacement from a prescribed ground track, means for providing a second signal having a value dependent upon the direction of craft approach toward said ground track, means for combining said first and second signals, means for limiting the maximum value of the resultant signal to some predetermined value whereby to limit the angle of approach of the craft when operated in accordance with said resultant signal, means for providing a third signal having a value determined by the roll attitude of said craft, means for algebraically combining said limited resultant signal and said third signal, and means for supplying the output of said last mentioned means to said actuating means whereby said indicator will be maintained substantially coincident with said reference position when the roll attitude of said craft is so adjusted as to cause said craft to correctly approach and thereafter maintain said track.

9. In a craft navigation aid of the character described, the combination with an indicator having a reference position and a movable element normally coincident therewith and actuating means for moving said element relative thereto, means for providing a first signal having a value determined by craft displacement from a prescribed ground track, means for providing a second signal having a value dependent upon the direction of craft approach toward said ground track, means for limiting the maximum value of said first signal to some predetermined value, means for combining said first and second signals, means for limiting the maximum value of the resultant signal to some predetermined value, means for providing a third signal having a value determined by the roll attitude of said craft, means for algebraically combining said limited resultant signal and said roll signal and means for supplying the output of said last mentioned means to said actuating means, whereby said indicator will be maintained substantially coincident with said reference position when the roll attitude of said craft is so adjusted so as to cause the craft to approach and thereafter maintain said track.

10. In a navigation system of the character described, means for providing a first signal having a value determined by craft displacement from a prescribed ground track, means for providing a second signal having a value dependent upon the direction of craft approach toward said ground track, means for algebraically combining said first and second signals, means for limiting the maximum value of the resultant signal to some predetermined value whereby to limit the angle of approach of the craft when operated in accordance with said resultant signal, means for providing a signal having a value determined by the roll attitude of said craft, and means for supplying a signal proportional to the algebraic sum of all of said signals.

11. In a craft navigation aid of the character described, the combination with an indicator having a reference position and a movable element normally coincident therewith and actuating means for moving said element relative thereto, means for providing a signal having a value determined by craft displacement from a predetermined altitude, means for limiting the maximum value of said displacement signal to some predetermined value whereby to limit the angle of approach of the craft when operated in accordance with said displacement signal, means for providing a signal having a value determined by the pitch attitude of said craft, means for algebraically combining said displacement signal and said pitch attitude signal, and means for supplying the resultant thereof to said actuating means, whereby when said indicator is maintained substantially coincident with said reference position, the adjusted pitch attitude of said craft will cause said craft to approach and thereafter maintain said altitude.

12. In a craft navigation aid of the character described, the combination with an indicator having a reference position and a movable element normally coincident therewith and actuating means for moving said element relative thereto, means for providing a signal having a value determined by craft vertical displacement from a predetermined radio path, means for limiting the maximum value of said displacement signal to some predetermined value whereby to limit the angle of approach of the craft when operated in accordance with the vertical displacement signal, means for providing a signal having a value determined by the pitch attitude of said craft, means for algebraically combining said displacement signal and said pitch attitude signal, and means for supplying the resultant thereof to said actuating means, whereby when said indicator is maintained substantially coincident with said reference position the adjusted pitch attitude of said craft will cause said craft to approach and thereafter maintain said radio path.

13. In a craft navigation aid of the character described, the combination with an indicator having a reference position and a movable element normally coincident therewith and actuating means for moving said element relative thereto, radio receiver means on said craft responsive to transmitted radio signals which determine a prescribed ground track, said radio receiver means being adapted to provide a signal having a value dependent upon the magnitude and direction of craft displacement from said ground track, means for providing a signal having a value dependent upon the direction of craft approach toward said ground track, amplifier means for receiving and algebraically summing said displacement and direction signals, said amplifier having such characteristics that saturation thereof will occur when the resultant signal reaches some predetermined value whereby the output signal of said amplifier is limited to a predetermined maximum value for displacement and direction changes of said craft exceeding in their algebraic sum some predetermined magnitude, means for providing a third signal having a value determined by the roll attitude of the craft, said roll attitude signal substantially equalizing the output of said amplifier when the roll attitude of the craft is so adjusted that the craft will approach said ground track and thereafter maintain said track, whereby changes in craft attitude cannot exceed predetermined maximum values.

14. In a craft navigation aid of the character described, the combination with an indicator having a reference position and an element movable above and below said reference position and actuating means for moving said element, radio receiver means on said craft responsive to transmitted radio signals defining a glide slope radio path for producing a signal having a value dependent upon the magnitude and direction of craft displacement from said radio path, means for providing a signal having a value determined by the pitch attitude of said craft, means for providing an additional signal having a predetermined fixed value dependent upon the normal landing pitch attitude angle of said craft, and means for algebraically combining said signals and supplying the resultant signal to said actuating means, said resultant signal being zero when the pitch attitude of said craft is so adjusted as to cause said craft to approach and thereafter maintain said glide slope path with the craft in its normal landing pitch attitude.

15. In a craft navigation aid of the character described the combination with an indicator having a reference position and a movable element normally coincident therewith and actuating means for moving said element relative thereto, means for providing a signal dependent upon craft departure from a predetermined radio glide slope approach beam, means for providing a signal dependent upon craft departure from a predetermined fixed altitude, amplifier means for controlling said actuating means, switch means for supplying said radio glide slope signal to said amplifier means, means for supplying said altitude departure signal to said amplifier means, and an interlock device operated by said switch means for preventing said altitude signal from being supplied to said amplifier means when said switch is operated, whereby to cause said altitude signal to be removed from said amplifier means when said glide slope signal is supplied thereto thereby preventing conflicting signals from being supplied to said amplifier means.

16. A navigating system for aircraft whereby the craft may be caused to approach and thereafter maintain a chosen course, said system comprising means for obtaining a signal proportional to the error between the present craft course and the desired course, means for obtaining a signal proportional to a time integral of said error signal, means for obtaining a signal corresponding to the angle of bank of the craft, and means connected to receive said signals for supplying an output proportional to the algebraic sum thereof.

17. A navigating system for aircraft whereby the craft may be caused to approach and thereafter maintain a chosen course, said system comprising means for obtaining a signal proportional to the displacement of said craft from a chosen ground track reference, means for obtaining a signal proportional to a time integral of said displacement signal, means for obtaining a signal proportional to the angle between the direction of flight of said aircraft and the bearing of said ground track, means for obtaining a signal proportional to the angle of bank of the craft, and means connected to receive said signals for supplying an output proportional to the algebraic sum thereof.

18. A navigating system for aircraft whereby the craft may be caused to approach and thereafter maintain a chosen course, said system comprising means for obtaining a signal proportional to the displacement of said craft from a chosen ground track reference, means for obtaining a signal proportional to the angle between the direction of flight of said aircraft and the bearing of said ground track, means for obtaining a signal proportional to the time integral of one of said above-mentioned signals, means for obtaining a signal proportional to the angle of bank of the craft, and means connected to receive said signals for supplying an output proportional to the algebraic sum thereof.

19. In a navigating system by means of which a craft may be controlled to approach and thereafter maintain a chosen course, means for obtaining a signal proportional to displacement of said craft from the desired course, means for limiting the maximum value of said signal to some predetermined value whereby to limit the angle of approach of the craft when operated in accordance with said signal, means for obtaining a signal proportional to the time integral of said signal, means for obtaining a signal corresponding to the angle of bank of the craft, and means connected to receive said signals for supplying an output proportional to the algebraic sum thereof.

20. In a navigating system by means of which a craft may be controlled to approach and thereafter maintain a chosen course, means for obtaining a signal proportional to craft displacement from a radio defined path, means for limiting the maximum value of said signal to some predetermined value whereby to limit the angle of approach of the craft when operated in accordance with said signal, means for obtaining a signal corresponding to the angle of bank of the craft, and means connected to receive said signals for supplying an output proportional to the algebraic sum thereof.

21. In a navigating system by means of which a craft may be controlled to approach and thereafter maintain a chosen course, means for providing a first signal proportional to craft displacement from a radio beam, means for limiting the maximum value of said signal to some predetermined value whereby to limit the angle of approach of the craft when operated in accordance with said signal, means for providing a second signal having a value dependent upon the rate of approach of the craft toward said radio beam, means for providing a third signal corresponding to the angle of bank of the craft, and means connected to receive said signals for supplying an output proportional to the algebraic sum thereof.

22. In a navigating system by means of which a craft may be controlled to approach and thereafter maintain a chosen course, means for providing a first signal proportional to craft displacement from a radio beam, means for providing a second signal having a value dependent upon the rate of approach of the craft toward said radio beam, means for limiting the maximum value of said first and second signals to some predetermined value whereby to limit the angle of approach of the craft when operated in accordance with said signals, means for providing a third signal corresponding to the bank angle of the craft, and means connected to receive said signals for supplying an output proportional to the algebraic sum thereof.

23. In a navigating system by means of which a craft may be controlled to approach and thereafter maintain a chosen course, means for providing a signal proportional to craft displacement from a reference altitude, means for limiting the maximum value of said signal to some predetermined value whereby to limit the angle of approach of the craft when operated in accordance with said signal, means for providing a signal corresponding to the pitch angle of the craft, and means connected to receive said signals for supplying an output proportional to the algebraic sum thereof.

24. In a navigating system by means of which a craft may be controlled to approach and thereafter maintain a chosen course, means for supplying a signal proportional to vertical craft displacement from a radio defined glide path, means for limiting the maximum value of said signal to some predetermined value whereby to limit the angle of approach of the craft when operated in accordance with said signal, means for providing a signal corresponding to the pitch angle of the craft, and means connected to receive said signals for supplying an output proportional to the algebraic sum thereof.

25. In a navigating system by means of which a craft may be controlled to approach and thereafter maintain a chosen course, means for providing a first signal proportional to vertical craft displacement from a radio defined glide path, means for providing a second signal dependent upon the craft departure from a preselected altitude, amplifier means for receiving said signals, switch means for selectively supplying said first signal and said second signal to said amplifier means, and an interlock device operated by said switch means for preventing said second signal from being supplied to said amplifier means when said switch means is operated to supply said first signal thereto.

26. A navigating system by means of which a craft may be controlled to approach and thereafter maintain a chosen course, comprising a meter of the cross pointer type having a vertically movable pointer movable with respect to a reference position and a horizontally movable pointer movable relative to a reference position, means for obtaining a first signal proportional to craft displacement from a selected course, means for limiting the maximum value of said first signal to some predetermined value whereby to limit the angle of approach of the craft when operated in accordance with said signal, means for providing a second signal corresponding to the bank angle of the craft, means connected to receive said signals for supplying an output proportional to the algebraic sum thereof in controlling relation to the horizontally movable pointer of said meter, means for obtaining a third signal proportional to displacement of the craft from a reference altitude, means for limiting the maximum value of said third signal to some predetermined value whereby to limit the angle of approach of the craft when operated in accordance with said signal, means for obtaining a fourth signal corresponding to the pitch angle of the craft, and means connected to receive said third and fourth signals for supplying an output proportional to the algebraic sum thereof in controlling relation to the vertically movable pointer of said meter.

27. A navigating system by means of which a craft may be controlled to approach and thereafter maintain a chosen course, comprising a meter of the cross pointer type having a vertically movable pointer movable with respect to a reference position and a horizontally movable pointer movable relative to a reference position, means for providing a first signal proportional to craft displacement from a radio defined path, means for limiting the maximum value of said first signal to some predetermined value whereby to limit the angle of approach of the craft when operated in accordance with said signal, means for obtaining a second signal having a value dependent upon the rate of approach of the craft toward said radio beam, means for providing a third signal corresponding to the angle of bank of the craft, means connected to receive said signals for supplying an output proportional to the algebraic sum thereof in controlling relation to the horizontally movable pointer of said meter, means for obtaining a fourth signal proportional to craft displacement from a reference altitude, means for limiting the maximum value of said fourth signal to some predetermined value whereby to limit the angle of approach of the craft when operated in accordance with said signal, means for providing a fifth signal corresponding to the pitch angle of the craft, and means connected to receive said fourth and fifth signals for supplying an output proportional to the algebraic sum thereof in controlling relation to the vertically movable pointer of said meter.

28. A navigating system by means of which a craft may be controlled to approach and thereafter maintain a chosen course, comprising a meter of the cross pointer type having a vertically movable pointer movable with respect to a reference position and a horizontally movable pointer movable relative to a reference position, means for providing a first signal proportional to craft displacement from a radio defined path, means for limiting the maximum value of said first signal to some predetermined value whereby to limit the angle of approach of the craft when operated in accordance with said signal, means for obtaining a second signal proportional to departure of the craft from a preselected heading, means for providing a third signal corresponding to the angle of bank of the craft, means connected to receive said signals for supplying an output proportional to the algebraic sum thereof in controlling relation to the horizontally movable pointer of said meter, means for obtaining a fourth signal proportional to craft displacement from a reference altitude, means for limiting the maximum value of said fourth signal to some predetermined value whereby to limit the angle of approach of the craft when operated in accordance with said signal, means for providing a fifth signal corresponding to the pitch angle of the craft, and means connected to receive said fourth and fifth signals for supplying an output proportional to the algebraic sum thereof in controlling relation to the vertically movable pointer of said meter.

29. In a navigating system by means of which a craft may be controlled to approach and thereafter maintain a chosen course, means for supplying a signal proportional to vertical craft displacement from a radio defined glide path, means for providing a signal corresponding to the pitch angle of the craft, means for providing a signal having a predetermined fixed value dependent upon the normal landing pitch attitude angle of the craft, and means connected to receive said signals for supplying an output proportional to the algebraic sum thereof.

30. In a navigating system by means of which a craft may be controlled to approach and thereafter maintain a chosen course, means for supplying a signal proportional to vertical craft displacement from a radio defined glide path, means for limiting the maximum value of said signal to some predetermined value whereby to limit the angle of approach of the craft when operated in accordance with said signal, means for providing a signal corresponding to the pitch angle of the craft, means for providing a signal having a predetermined fixed value dependent upon the normal landing pitch attitude angle of the craft, and means connected to receive said signals for supplying an output proportional to the algebraic sum thereof.

31. In a navigating system by means of which a craft may be controlled to approach and thereafter maintain a chosen course, means for obtaining a signal proportional to craft displacement from a radio defined path, means for limiting the maximum value of said signal to some predetermined value whereby to limit the angle of approach of the craft when operated in accordance with said signal, means for obtaining a signal corresponding to the angle of bank of the craft, and guidance means operated in accordance with all of said signals.

32. In a navigating system by means of which a craft may be controlled to approach and thereafter maintain a chosen course, means for supplying a signal proportional to vertical craft displacement from a radio defined glide path, means for providing a signal corresponding to the pitch angle of the craft, means for providing a signal having a predetermined fixed value dependent upon the normal landing pitch attitude angle of the craft, and guidance means operated in accordance with all of said signals.

SPENCER KELLOGG, 2ND.

REFERENCES CITED

The following references are of record in the file of this patent:

UNITED STATES PATENTS

| Number | Name | Date |
|---|---|---|
| Re. 23,066 | Moseley | Dec. 21, 1948 |
| 1,306,552 | Minorsky | June 10, 1919 |
| 1,436,280 | Minorsky | Nov. 21, 1922 |
| 1,703,280 | Minorsky | Feb. 26, 1929 |
| 1,703,317 | Minorsky | Feb. 26, 1929 |
| 2,257,757 | Moseley | Oct. 7, 1941 |
| 2,372,185 | Wittkuhns | Mar. 27, 1945 |
| 2,502,721 | Halpert | Apr. 4, 1950 |

FOREIGN PATENTS

| Number | Country | Date |
|---|---|---|
| 516,567 | Great Britain | Jan. 5, 1940 |
| 594,484 | Great Britain | Nov. 12, 1947 |

Disclaimer 2,613,352.—*Spencer Kellogg, 2nd*, Glen Head, N. Y. RADIO NAVIGATION SYSTEM. Patent dated Oct. 7, 1952. Disclaimer filed Feb. 28, 1957, by the inventor; the assignee, *Sperry Rand Corporation*, consenting.

Hereby enters this disclaimer to claim 20 of said patent.

[*Official Gazette April 2, 1957.*]